(12) United States Patent
Han et al.

(10) Patent No.: US 12,019,263 B2
(45) Date of Patent: Jun. 25, 2024

(54) HOME APPLIANCE

(71) Applicant: LG Electronics Inc., Seoul (KR)

(72) Inventors: Doyoun Han, Seoul (KR); Hyesun Jung, Seoul (KR); Jaesung Park, Seoul (KR)

(73) Assignee: LG Electronics Inc., Seoul (KR)

(*) Notice: Subject to any disclaimer, the term of this patent is extended or adjusted under 35 U.S.C. 154(b) by 0 days.

(21) Appl. No.: 17/988,384

(22) Filed: Nov. 16, 2022

(65) Prior Publication Data

US 2023/0152504 A1    May 18, 2023

(30) Foreign Application Priority Data

Nov. 16, 2021 (KR) .................. 10-2021-0157921

(51) Int. Cl.
  *F21V 8/00* (2006.01)
  *F25D 23/02* (2006.01)
  *F25D 27/00* (2006.01)

(52) U.S. Cl.
  CPC ......... *G02B 6/0036* (2013.01); *F25D 23/028* (2013.01); *F25D 27/005* (2013.01); *G02B 6/0073* (2013.01)

(58) Field of Classification Search
  CPC ... G02B 6/0036; G02B 6/0073; F25D 23/028; F25D 27/005
  See application file for complete search history.

(56) References Cited

U.S. PATENT DOCUMENTS

| | | | | |
|---|---|---|---|---|
| 6,840,773 B2* | 1/2005 | Anderson | ................. | B44C 1/10 434/81 |
| 7,246,926 B2* | 7/2007 | Harwood | ................. | F21S 4/20 362/372 |
| 8,668,292 B2* | 3/2014 | Pae | ....................... | F25D 23/028 312/405 |
| 8,789,900 B2 | 7/2014 | Laible et al. | | |
| 10,306,728 B2* | 5/2019 | Crosbie | ..................... | F21S 2/00 |
| 10,561,256 B2* | 2/2020 | Allen | ..................... | A47F 11/10 |
| 10,724,791 B2* | 7/2020 | Kwon | ..................... | H05K 1/14 |

(Continued)

FOREIGN PATENT DOCUMENTS

| | | |
|---|---|---|
| CN | 103250018 | 8/2013 |
| CN | 106123457 | 11/2016 |
| WO | WO 2014208585 | 12/2014 |

OTHER PUBLICATIONS

Extended European Search Report in European Appln. No. 22207771.1, dated Apr. 13, 2023, 11 pages.

*Primary Examiner* — Arman B Fallahkhair
(74) *Attorney, Agent, or Firm* — Fish & Richardson P.C.

(57) ABSTRACT

A home appliance includes a cabinet having a storage space formed therein; a door configured to open and close an open front of the cabinet; a panel assembly mounted on a front surface of the door; and a controller, wherein the panel assembly includes: a front plate forming a front exterior of the door and transmitting light; and a lighting device emitting light of a set color, wherein the front plate includes: a base layer; and a colored layer formed on one surface of the base layer and has a first color, wherein the front surface of the door has the first color when the lighting device is turned off, and wherein the front surface of the door shines in a color selected by a user when the lighting device is turned on.

20 Claims, 16 Drawing Sheets

(56) References Cited

U.S. PATENT DOCUMENTS

| | | | |
|---|---|---|---|
| 11,614,579 B2* | 3/2023 | Wright | G02B 6/0051 |
| | | | 362/606 |
| 2009/0045705 A1 | 2/2009 | Laible et al. | |
| 2011/0134627 A1 | 6/2011 | Hamlin et al. | |
| 2013/0194167 A1* | 8/2013 | Yun | H10K 59/50 |
| | | | 345/84 |
| 2017/0191746 A1 | 7/2017 | Seo | |
| 2018/0010846 A1 | 1/2018 | Snyder et al. | |
| 2019/0307263 A1 | 10/2019 | Lee et al. | |
| 2020/0173716 A1 | 6/2020 | Choi et al. | |

* cited by examiner

HOME APPLIANCE

CROSS-REFERENCE TO RELATED APPLICATIONS

The present application claims priority under 35 U.S.C. 119 and 35 U.S.C. 365 to Korean Patent Application No. 10-2021-0157921, filed on Nov. 16, 2021, the disclosure of which is hereby incorporated by reference in its entirety.

BACKGROUND OF THE INVENTION

1. Field of the Invention

The present disclosure relates to home appliances.

2. Discussion of the Related Art

In general, a home appliance is arranged indoors, and may be arranged to harmonize with a surrounding space. To further improve the appearance of the home appliance, a panel forming an exterior may be provided on the front surface of the home appliance.

Typically, structures for varying the front exterior of a refrigerator in order to harmonize with an environment in which the refrigerator is placed, surrounding furniture, or other home appliances are being developed, and this trend is being made throughout the home appliances.

Representatively, U.S. Pat. No. 8,789,900 discloses a structure in which a decor panel forming the front exterior of a refrigerator door is mounted on the front surface of the refrigerator door, and the decor panel is detachably provided to form the front exterior of the door according to a user's preference.

However, in a refrigerator having such a structure, if a user wants to change the exterior, the entire decor panel needs be removed and replaced, and the decor panel used before replacement cannot be used anymore.

In order to solve such a problem, a refrigerator capable of changing the front surface of a refrigerator door, that is, the front exterior of a refrigerator without disassembling the refrigerator door, has been developed.

Representatively, Chinese Patent No. 103250018 discloses a refrigerator in which a reflective layer and a transparent panel are provided on the front surface of a refrigerator door, and a light emitting member having a color is mounted on both side ends of the reflective layer so that the transparent panel is able to shine in a set color.

However, in the refrigerator having such a structure, there is a problem in that the internal configuration is exposed to a user due to the transparent panel when the light emitting member is turned off.

In addition, when the transmittance of light of the transparent panel is lowered to conceal the internal configuration, it is difficult to implement a set color.

In addition, in a state in which the light emitting member is turned off, the exterior of the transparent panel is also poor.

SUMMARY OF THE INVENTION

It is an object of the present disclosure to provide a home appliance, e.g. a kitchen appliance such as a refrigerator, having a front surface configured to emit light.

It is an object of the present disclosure to provide a home appliance, e.g. a kitchen appliance such as a refrigerator, that allow the entire front surface of the appliance, e.g. a front surface of a door, to shine evenly.

It is an object of the present disclosure to provide a home appliance, e.g. a kitchen appliance such as a refrigerator, capable of having different color appearances when the lighting device is turned on and off without disassembling and assembling the door.

It is an object of the present disclosure to provide a home appliance, e.g. a kitchen appliance such as a refrigerator, having a front surface of the appliance, e.g. a front surface of the door, that is able to be expressed in the same color as the color set by a user, even when the light emitted by a lighting device passes through the front plate having a specific color.

It is an object of the present disclosure to provide a home appliance, e.g. a kitchen appliance such as a refrigerator, having a front surface, e.g. a front surface of a door, that is configured to express various colors set or selected by a user.

It is an object of the present disclosure to provide a home appliance, e.g. a kitchen appliance such as a refrigerator, having a front surface, e.g. a front surface of a door, that is configured to change its color to various colors set or selected by a user using colored light passing through the front surface.

It is an object of the present disclosure to provide a home appliance, e.g. a kitchen appliance such as a refrigerator, having a luxurious appearance and texture.

One or more of these objects are solved by the features of the independent claim.

According to an aspect of the present disclosure, a home appliance includes a cabinet having a (storage) space formed therein; a door configured to open and close an open front of the cabinet; a panel assembly mounted on a front surface of the door; and a controller, wherein the panel assembly includes: a front plate forming a front exterior of the door and transmitting light; and a lighting device emitting light of a set color, wherein the front plate includes: a base layer; and a colored layer formed on one surface of the base layer and has a first color, wherein the front surface of the door has the first color when the lighting device is turned off, and wherein the front surface of the door shines in a color selected by a user when the lighting device is turned on.

According to a further aspect, a home appliance includes a cabinet having a space formed therein; and a door configured to open and close the cabinet and including a panel assembly, wherein the panel assembly includes a lighting device configured to emit light and a front plate forming an exterior (e.g. a front exterior or front surface) of the door and configured to transmit light emitted by the lighting device. The home appliance includes further a controller configured to control the lighting device, e.g. based on a user input. The front plate includes a base layer and a colored layer formed on the base layer, the colored layer having a first color.

The home appliance according to any one of these aspects may include one or more of the following features:

The panel assembly, in particular the front plate, or the front surface of the door may have the first color when the lighting device is turned off, and a second color different from the first color when the lighting device is turned on. The panel assembly, in particular the front plate, may be disposed or arranged or mounted on (or at) a front surface and/or exterior surface of the door. The panel assembly, in particular the front plate, may be configured to change its color depending on a state of the lighting device, i.e. an emission state of the lighting device. The front plate may form a front surface and/or exterior surface of the door.

The lighting device may be disposed at a rear surface or rear side of the front plate. The lighting device may be configured to emit light of at least one color that is different from the first color of the colored layer. The lighting device may be configured to emit light of different colors.

The colored layer may be formed on an inner surface of the base layer, i.e. on a surface of the base layer facing the space of the cabinet in a closed state of the door. That is, the colored layer may be formed on a rear surface of the base layer, i.e. on a surface of the base layer facing the lighting device and/or the space in a closed state of the door.

The controller may be configured to receive information about the second color selected by a user, e.g. from a remote control device and/or from a user interface of the home appliance. The second color may be selectable from a plurality of (different) colors.

The controller may be configured to control the lighting device to emit light in a third color adjusted such that the front plate has the second color, e.g. selected by the user, in consideration of the first color.

The first color and the second color may be colors having different RGB values. The first color, the second color, and the third color may be colors all having different RGB values.

The controller may be configured to receive information on a RGB value of the second color selected by the user, and to calculate a RGB value of the third color in consideration of the received RGB value of the third color and a previously stored RGB value of the first color.

The first color may have a lightness greater than 0.

The lighting device may include a plurality of light sources. The light sources may be RGB LEDs. The lighting device may include a plurality of light sources configured to emit light of different colors.

The base layer may be made of a transparent material, a glass or a transparent plastic material.

The base layer may be a deposited glass.

The base layer may be any one of ABS (acrylonitrile butadiene styrene), PMMA (polymethyl methacrylate), and PC (polycarbonate) resin.

The colored layer may have a lightness greater than 0.

The colored layer may be formed by a silk screen printing method.

A pattern layer may be provided on or in the base layer, e.g. a front surface of the base layer. The pattern layer may be configured to define a texture of the front plate and/or of the door, i.e. a front surface of the door. That is, the front plate may further include a pattern layer provided on the other surface of the base layer to form a texture on the front plate.

The pattern layer may include a transparent film, e.g. a transparent film formed of a resin material. The pattern layer may be formed by imprinting of UV curable resin composition applied on the film with a molding roller having a pattern on the film, and UV curing. That is, the pattern layer may include an imprint of UV cured resin composition on a transparent film. The pattern layer may be covered with UV curable resin composition on one surface of a transparent plastic film layer.

The pattern layer may be formed by a UV imprinting method.

The front plate further may include a protective layer formed on one surface of the colored layer and including an anti-scattering film.

The protective layer may have a white or white-based color.

The front plate may further include the colored layer formed on a rear surface of the base layer, the front plate may further include a pattern layer provided on a front surface of the base layer to form a texture on the front plate, and the front plate may further include a protective layer formed on a rear surface of the colored layer and including an anti-scattering film.

The front plate may further include a deposition layer. The deposition layer may include a metal.

The home appliance may be any one of a refrigerator, a laundry machine, a clothing manager, a washing machine, a drier, a dishwasher, and a cooking appliance.

The following effects can be expected in the home appliance according to the proposed embodiment.

According to the present disclosure, the door panel forming the front surface of the home appliance includes a light-transmissive front plate and a lighting device that emits light, so that the entire front surface of the door can emit light according to the user's needs.

In particular, a plurality of light sources constituting the lighting device can emit light of different colors, so that the front surface of the door can shine in a color set by the user.

In addition, the front plate forming the front exterior of the door includes a colored layer implementing the color of the front plate itself on one surface of the base layer capable of transmitting light, so that even when the lighting device is turned off, the door panel may be formed to be at least transparent or have a color with a lightness of 0 or more other than black. Accordingly, it is possible to implement a luxurious appearance even when the lighting device is turned off.

In addition, by reflecting the degree of distortion of the color of the light as the light emitted from the lighting device passes through the front plate, the color of the light source is controlled to be adjusted, so that the exterior of the door can be expressed in the same color as the color set by the user.

BRIEF DESCRIPTION OF THE DRAWINGS

FIG. 15 is a front view showing the front exterior of the refrigerator in a state in which the lighting device is turned on.

DETAILED DESCRIPTION OF THE PREFERRED EMBODIMENTS

Hereinafter, specific embodiments of the present disclosure will be described in detail with reference to the drawings. The present disclosure may, however, be embodied in many different forms and should not be construed as limited to the example embodiments set forth herein. Rather, the described aspect is intended to embrace all such alterations, modifications, and variations that fall within the scope and novel idea of the present disclosure.

Before making a description, directions are defined. According to an embodiment of the present disclosure, the direction toward the door is the front with respect to the cabinet shown in FIG. 1, the direction toward the cabinet with respect to the door is the rear, the direction toward the floor where the refrigerator is installed is downward, and the direction toward the door is farther from the floor. The direction can be defined as upward.

Figure 1:
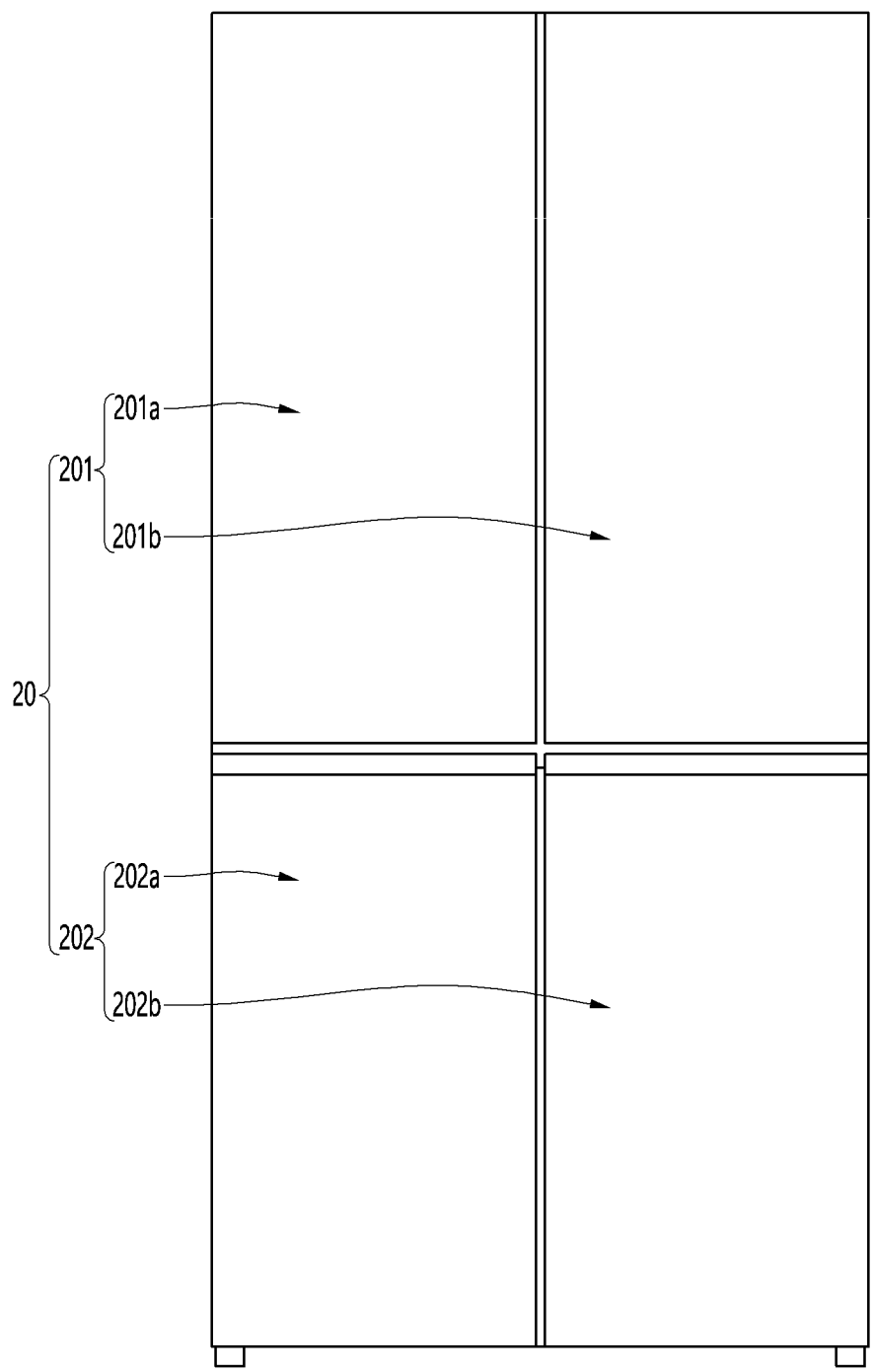
FIG. 1 is a front view of a refrigerator according to an embodiment of the present disclosure.
Figure 2:
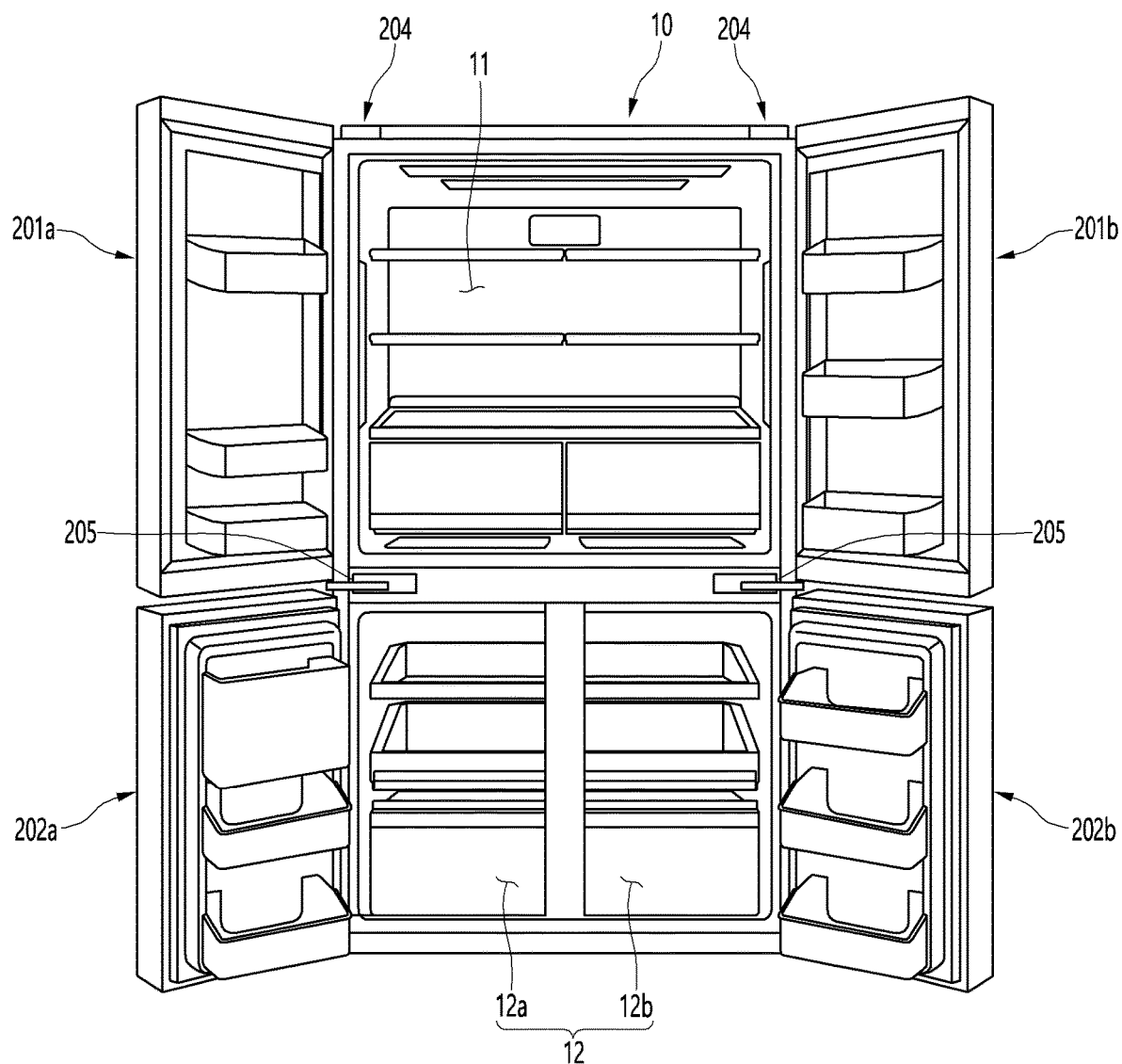
FIG. 2 is a front view of the refrigerator when a refrigerator door is opened.

FIG. 1 is a front view of a refrigerator according to an embodiment of the present disclosure. FIG. 2 is a front view of the refrigerator when a refrigerator door is opened.

As illustrated in FIGS. 1 and 2, a refrigerator 1 according to an embodiment of the present disclosure has an external appearance defined by a cabinet 10 defining a storage space, and a door 20 for opening and closing the storage space of the cabinet 10.

Specifically, the cabinet 10 may define the storage space partitioned vertically, and include a refrigerating chamber 11 positioned on an upper side, and a freezing chamber 12 positioned on a lower side. The refrigerating chamber 11 may be referred to as an upper storage space, and the freezing chamber 12 may be referred to as a lower storage space. In addition, the freezing chamber 12 may be divided into left and right portions to form a left freezing chamber 12a and a right freezing chamber 12b, respectively. The left freezing chamber 12a may be referred to as a lower left storage space, and the right freezing chamber 12b may be referred to as a lower right storage space.

The door 20 may be configured to open and close the refrigerating chamber 11 and the freezing chamber 12, individually. For example, the door 20 may be rotatably mounted to the cabinet 10, and may open and close the refrigerating chamber 11 and the freezing chamber 12 individually by rotation. It is noted that the door 20 may have a structure that is opened and closed by a pull-out.

The door 20 may include a refrigerating chamber door 201 for opening and closing the refrigerating chamber 11 and a freezing chamber door 202 for opening and closing the freezing chamber 12. The refrigerating chamber door 201 may be referred to as an upper door, and the freezing refrigerating chamber door 202 may be referred to as a lower door.

In addition, the refrigerating chamber door 201 may include a pair of a left refrigerating chamber door 201a and a right refrigerating chamber door 201b arranged side by side. The left refrigerating chamber door 201a and the right refrigerating chamber door 201b may be disposed adjacent to each other and may have the same size. In addition, the left refrigerating chamber door 201a and the right refrigerating chamber door 201b may be independently rotated to open and close the refrigerating chamber 11.

The upper and lower ends of the refrigerating chamber door 201a and the freezing chamber door 201b may be coupled to the cabinet 10 by hinge devices 204 and 205, respectively. The hinge device 204 may include an upper hinge 204 and a lower hinge 205, to enable the refrigerating chamber door 201a and the freezing chamber door 201b to be rotatably mounted to the cabinet 10.

In addition, the freezing chamber door 202 may include a pair including a left freezing chamber door 202a and a right freezing chamber door 202b arranged side by side. In addition, the left freezing chamber door 202a and the right freezing chamber door 202b may be independently rotated to open and close the freezing chamber. The left freezing chamber door 202a and the right freezing chamber door 202b may be disposed adjacent to each other and may have the same size.

Although a refrigerator having a structure in which the refrigerating chamber 11 is disposed on an upper side and the freezing chamber 12 is disposed on a lower side is described for convenience of description and understanding, as an example in the present embodiment, the present disclosure is limited to the type of the refrigerator and may be applied to all types of refrigerators equipped with doors. In particular, although description is made for a refrigerator having four doors, the configuration set out below for the door 20 may be applied to a door of any home appliance, having any number of doors.

Meanwhile, the door 20 forms the front exterior of the refrigerator 1 in a closed state, and may form the exterior of the refrigerator 1 viewed from the front when the refrigerator 1 is installed.

The door 20 may have a structure in which the front surface is able to selectively emit light, and may be configured to shine in a set color or brightness. Accordingly, the user can change a color or brightness of the front surface of the door 20 without removing or disassembling the door 20, thus enabling a change in the overall exterior of the refrigerator 1.

Hereinafter, the structure of the door 20 will be described in detail with reference to the drawings. In addition, the embodiment of the present disclosure will be described with reference to the left refrigerating chamber door 201a, and other doors 201b, 202a, and 202b may also have the same structure.

Hereinafter, the structure of the door 20 will be described in detail with reference to the drawings.

Figure 3:
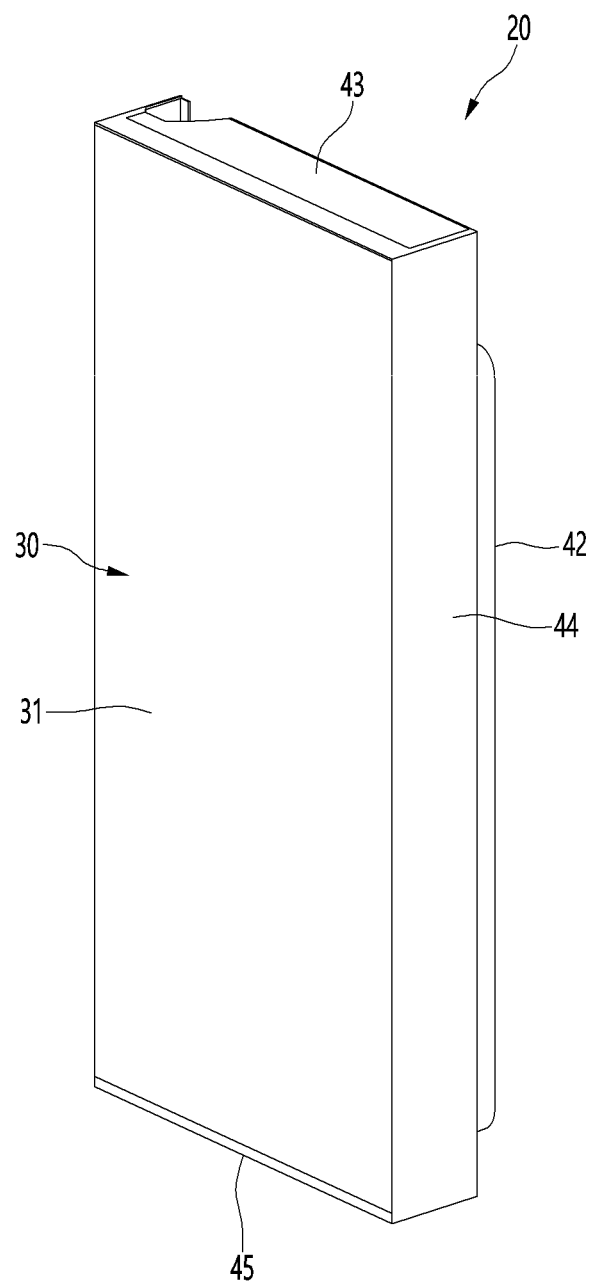
FIG. 3 is a perspective view of the door.
Figure 4:
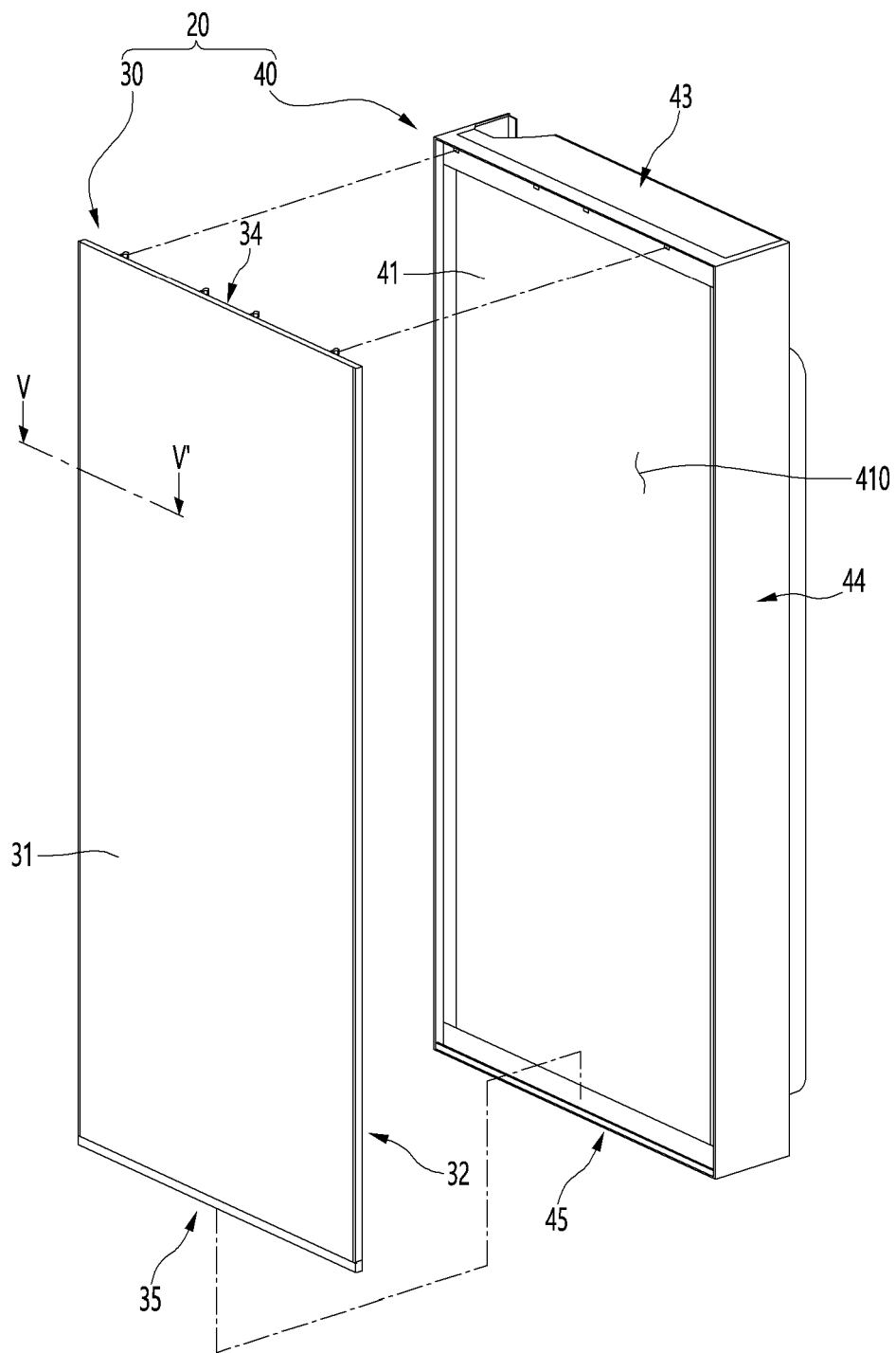
FIG. 4 is an exploded perspective view showing a state in which a panel assembly constituting the door and a door body are separated.

FIG. 3 is a perspective view of the door. FIG. 4 is an exploded perspective view showing the panel assembly constituting the door and the door body are separated.

As shown in FIG. 4, the door 20 may include a door body 40 defining the overall shape of the door 20 and a panel assembly 30 forming the front exterior of the door 20. That is, the door 20 may be configured such that the panel assembly 30 is mounted on the front surface of the door body 40.

The door body 40 may include a body plate 41 forming a front surface and a door liner 42 forming a rear surface. The body plate 41 may be formed of a metal material, and may be formed in a plate shape having a size corresponding to that of the panel assembly 30. In addition, the door liner 42 may be formed of a plastic material, and may form the appearance of the rear surface of the door 20.

The door body 40 may include side decorations 44 forming left and right-side surfaces of the door body 40. The side decoration 44 may connect the left and right-side ends of the body plate 41 and the left and right-side ends of the door liner 42.

In addition, the door body 40 may include an upper cap decoration 43 and a lower cap decoration 45 forming an upper surface and a lower surface of the door body 40, respectively. The upper cap decoration 43 may be connected to an upper end of the side decoration 44, an upper end of the body plate 41, and an upper end of the door liner 42. In addition, the lower cap decoration 45 may be connected to a lower end of the side decoration 44, a lower end of the body plate 41, and a lower end of the door liner 42.

The exterior of the door body 40 may be formed by the body plate 41, the door liner 42, the side decoration 44, the upper cap decoration 43, and the lower cap decoration 45. In addition a space inside the door body 40 formed by the coupling of the body plate 41, the door liner 2, the side decoration 44, the upper cap decoration 43, and the lower cap decoration 45. May be filled with an insulating material, and may have a structure capable of heat insulation so that heat is not transmitted through the door 20.

In addition, the upper cap decoration 43 may be constrained by an upper cover 46 mounted on the opened upper surface of the upper cap decoration 43.

Meanwhile, a panel accommodating space 410 opened to the front may be formed on the front surface of the door body 40. That is, the front ends of the side decoration 44, the upper cap decoration 43, and the lower cap decoration 45 may protrude more forward than the front surface of the body plate 41, and thus a panel accommodating space 410 having an open front may be formed in front of the body plate 41. The panel accommodating space 410 is formed to have a size corresponding to the size of the panel assembly 30, and the panel assembly 30 may be inserted into the panel accommodating space 410. In addition, the periphery of the panel assembly 30 is supported by the peripheral surface of the panel accommodating space 410, that is, the protruding portions of the side decoration 44, the upper cap decoration 43 and the lower cap decoration 45.

The panel assembly 30 may be formed in a plate shape, and may have a size corresponding to the front surface of the door body 40. Accordingly, when the panel assembly 30 is mounted on the front exterior of the door body 40, the panel assembly 30 may shield the front surface of the door body 40 to form the front appearance of the door 20. Since the panel assembly 30 forms the front exterior of the door 20, the panel assembly 30 may be referred to as a door panel. Alternatively, since the panel assembly 30 forms the front exterior of the refrigerator 1, the panel assembly 30 may also be referred to as an exterior panel.

In a state in which the panel assembly 30 is mounted on the door body 40, a rear surface of the panel assembly 30 may be closely fixed to the body plate 41.

On the other hand, for fixed mounting of the panel assembly 30, the lower end of the panel assembly 30 is caught with and constrained by the lower end of the lower cap decoration 45, and the upper end of the panel assembly 30 is coupled to the upper end of the front surface of the upper cap decoration 43 to firmly couple the panel assembly 30 to the door body 40. In addition, the panel assembly 30 may have a structure detachable from the door body 40 for service and maintenance.

The front surface of the panel assembly 30 is exposed to the front in a state in which the panel assembly 30 is mounted on the door body 40, and the panel assembly 30 may form a substantially front exterior of the door 20. In addition, the panel assembly 30 may be configured to emit light from the entire front surface, and may be configured to shine in various colors.

To this end, a lighting device 36 may be provided in the panel assembly 30. The lighting device 36 may be connected to an electric wire (not shown) for supply and control of power. The electric wire is exposed to the outside from the rear surface of the panel assembly 30, and a connector (not shown) may be provided at an end of the electric wire.

Hereinafter, the structure of the panel assembly 30 will be described in detail with reference to the drawings.

Figure 5:
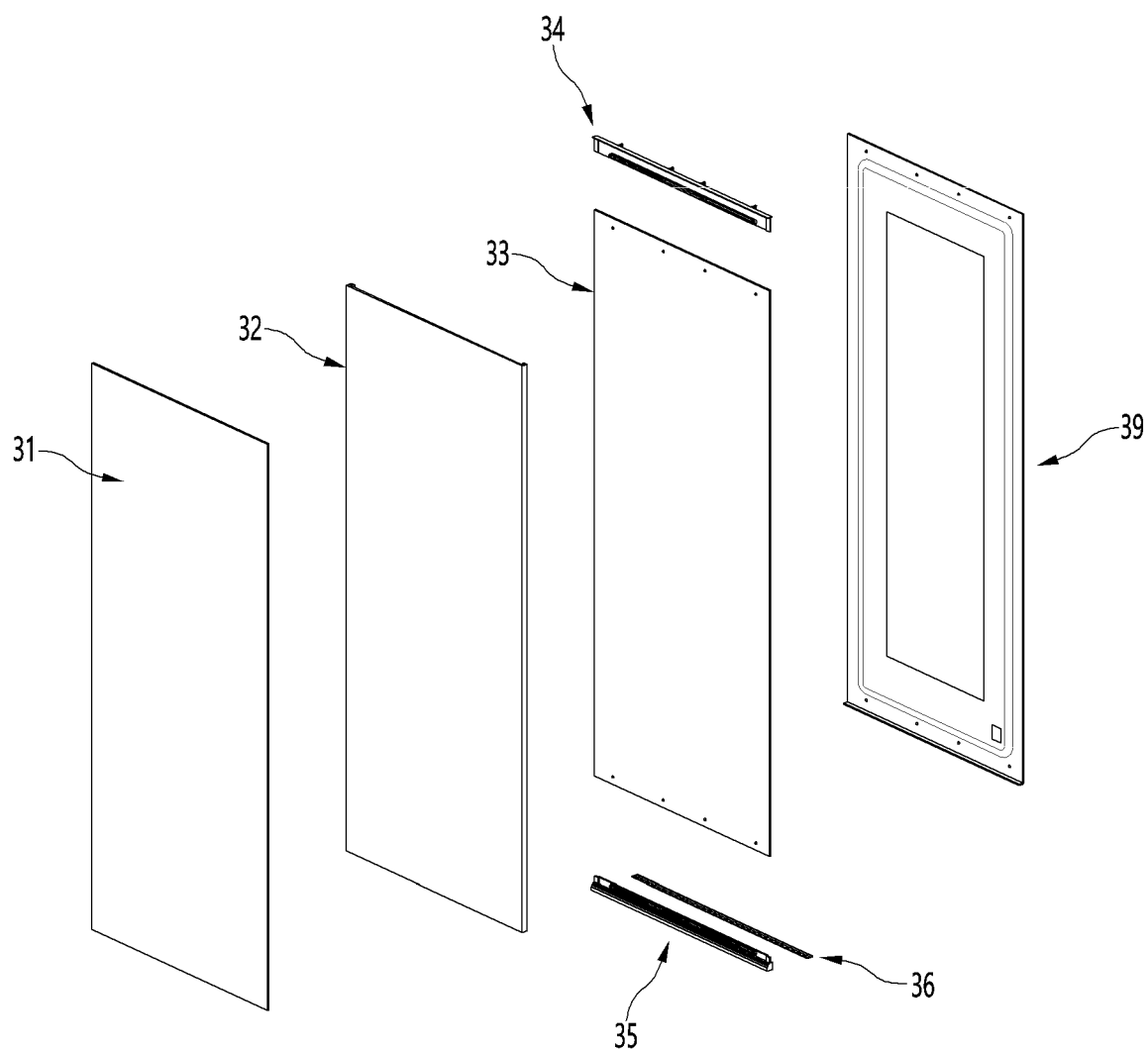
FIG. 5 is an exploded perspective view of the panel assembly.

FIG. 5 is an exploded perspective view of the panel assembly;

As shown in the drawing, the panel assembly 30 may include a front plate 31 forming a front exterior, a lighting device 36 for emitting light such that the front plate 31 shines, a light guide plate 33 for guiding light emitted from the light guide plate 33, and a support member 32 on which the light guide plate 33 and the front plate 31 are mounted.

In addition, the panel assembly 30 may further include an upper bracket 34 forming an upper surface of the panel assembly 30 and a lower bracket 35 forming a lower surface of the panel assembly 30. In addition, the lighting device 36 may be mounted on the lower bracket 35. In addition, the panel assembly 30 may further include a back cover 39 forming a rear surface of the panel assembly 30.

Specifically, the front plate 31 may be formed in a rectangular plate shape, and may be formed of a material capable of transmitting light. For example, the front plate 31 may be formed of a glass material such as blue glass, white glass, and deposition glass, or another material capable of transmitting light such as ABS (acrylonitrile butadiene styrene), PMMA (polymethyl methacrylate), PC (polycarbonate), or the like. In addition, the front plate 31 may be called a transparent plate, an out plate, or a panel.

The front plate 31 may be formed to be transparent such that light reflected by the light guide plate 33 may be transmitted. In this case, transparency may be defined to an extent that light reflected from the light guide plate is transmitted and emitted to the outside.

In addition, the front plate 31 may be formed to have a color, and may be formed to appear in a different color according to the operation or on/off state of the lighting device 36. For example, a specific design or pattern may be printed on the front plate 31 to have a specific color. In addition, a film on which a pattern having a specific design or color is printed is attached to the front plate 31, or a surface treatment such as imprinting, etching, or glass printing is performed on the front plate. Alternatively, a coating or deposition layer having a specific color and texture may be formed to form the exterior of the front plate 31.

In addition, the front plate 31 may be configured such that the light emitted from the lighting device 36 is transmitted but the components behind the front plate 31 are not reflected. That is, in the front plate 31, the internal components of the panel assembly 30 may be prevented from being seen from the outside through the front plate 31, by the color of the front plate 31 itself when the lighting device 36 is turned off.

In this case, the front plate 31 may be formed to have at least a color with a lightness of 0 or more, not black, when the front plate 31 is turned off. That is, in a state in which the refrigerator 1 is installed, the front surface of the refrigerator 1 may be seen in a color other than black, and the color of the front surface of the refrigerator may be changed according to the operation of the lighting device 36.

The front plate 31 may be formed to correspond to the size of the front surface of the panel assembly 30 exposed to the outside. Specifically, the front plate 31 may be formed to have the same size as the panel assembly 30 at the upper end and the left and right-side ends except for the lower end. In addition, in a state in which the panel assembly 30 is mounted, the exposed portion of the lower bracket 35 may be shielded by the lower cap decoration 45. Accordingly, the entire front surface of the front plate 31 exposed to the outside in a state in which the panel assembly 30 is mounted may be formed by the front plate 31.

Meanwhile, the front plate 31 may be formed to be larger than the light guide plate 33. In addition, the rear surface of the front plate 31 may be coupled to the front surface of the support member 32. Therefore, in a state in which the front plate 31 is mounted on the support member 32, a separate configuration does not exist on the periphery of the front plate 31, and the front plate 31 forms the front exterior of the panel assembly 30.

The light guide plate 33 may be positioned at a rear position spaced apart from the front plate 31, and may be configured to guide light emitted from the lighting device 36 disposed below the light guide plate 33.

For example, the light guide plate 33 may be formed of a transparent polymer material such as acrylic. In addition, the light guide plate 33 may be provided with a diffusion agent for diffusing the light incident on the light guide plate 33, or a pattern for light diffusion may be formed in the light guide plate 33. Accordingly, light can be transmitted to the front plate 31 by the light guide plate 33, and the pattern of the light guide plate 33 is set such that the entire front surface of the front plate 31 may shine with uniform brightness.

In addition, the light guide plate 33 may be supported from the rear by the back cover 39, and may be fixed in a state of being maintained by the support member 32 at a predetermined distance from the front plate 31.

Meanwhile, the support member 32 may be provided between the front plate 31 and the light guide plate 33. The light guide plate 33 and the front plate 31 are fixedly mounted to the support member 32, and in particular, the light guide plate 33 may be spaced apart from the front plate 31 at a predetermined distance by the support member 33.

The support member 32 may be formed such that a front surface supports the front plate 31, and both ends constrain both ends of the light guide plate 33.

On the other hand, the support member 32 may be formed of a material capable of transmitting light, and may be formed by injection or extruding as a single component. For example, the support member 32 may be formed of a material such as ABC, PC, or acryl, and the light reflected from the light guide plate 33 may be transmitted through the front plate 31.

In addition, the support member 32 may be formed entirely of a transparent or translucent material, and the support member 32 itself may be formed to have a color. Accordingly, when viewed from the front of the panel assembly 30, the color, texture, or shape of the front of the panel assembly 30 may be determined by the support member 32. In addition, the front surface of the support member 32 through which light is transmitted may be formed to have corrosion or pattern, and may be formed such that the corrosion or pattern appears when viewed from the front of the panel assembly 30.

The upper bracket 34 may be provided at an upper end of the panel assembly 30. The upper bracket 34 may form an upper surface of the panel assembly 30. In addition, the upper bracket 34 may be injection-formed from a plastic material, and may be formed to have a structure coupled to the support member 32 and a structure coupled to the back cover 39.

A lower bracket 35 may be provided at a lower end of the panel assembly 30. The lower bracket 35 may constitute a lower surface of the panel assembly 30. In addition, the lower bracket 35 may be injection-formed from a plastic material, and may be formed to have a structure coupled to the support member 32 and a structure coupled to the back cover 39.

In addition, the panel assembly 30 may include a plate supporter 47. The plate supporter 47 may form the exterior of the lower end of the panel assembly 30, and may allow the lower end of the panel assembly 30 to be fixed to the door body 40.

The plate supporter 47 may include a decorative front surface and a decorative lower surface. The lower bracket 35 may be inserted and mounted by the decorative front surface and the decorative lower surface. In addition, a lower protrusion 473 extending rearward and then protruding upward is provided at the rear end of the decorative lower surface 472, and is coupled to a lower portion of the door body 40.

In addition, the plate supporter 47 may be referred to as a lower decoration in that the plate supporter 47 is disposed at the lower end of the front plate 31.

In addition, the back cover 39 may be coupled to the rear surface of the lower bracket 35. The back cover 39 may be coupled to the back cover 39 by fastening a screw. In addition, the rear surface of the light guide plate 33 may be supported on the front surface of the lower bracket 35. That is, when the back cover 39 is coupled, the lower bracket 35 may support the light guide plate 33 from the rear side.

In addition, a lighting device 36 may be mounted in the lower bracket 35. The lighting device 36 is configured to emit light to determine the color and brightness of the front surface of the panel assembly, and to emit light toward the light guide plate 33. The lighting device 36 may be provided inside the lower bracket 35, and may be assembled and mounted together with the lower bracket 35 while being mounted in the lower bracket 35.

The back cover 39 forms a rear surface of the panel assembly 30, and may be coupled to the upper bracket 34 and the lower bracket 35. The back cover 39 may be formed of a metal material such as stainless steel or aluminum. In addition, the back cover 39 may be formed to have a size corresponding to the size of the panel assembly 30, and may form the entire rear surface of the panel assembly 30.

Hereinafter, the structure of the front plate 31 will be described in more detail with reference to the drawings.

Figure 6:
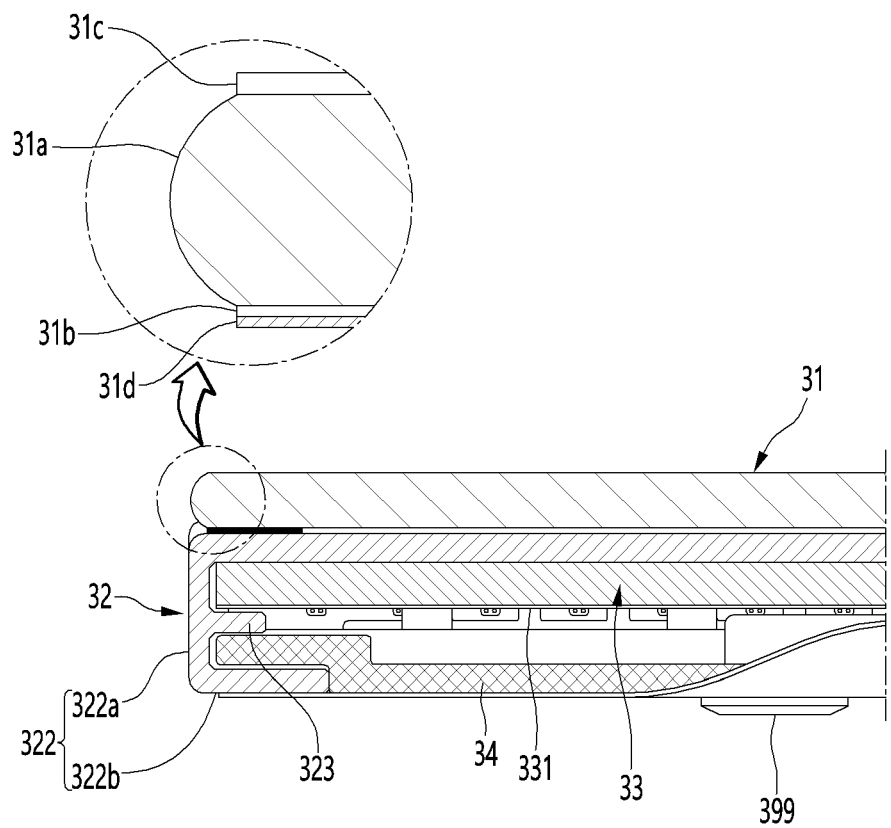
FIG. 6 is a cross-sectional view taken along line VI-VI' of FIG. 4.
Figure 7:
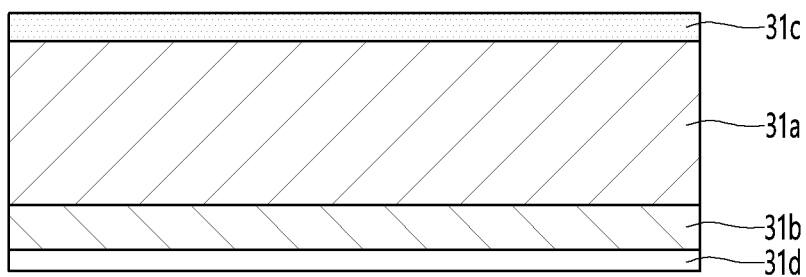
FIG. 7 is a cross-sectional view showing the configuration of the front plate according to an embodiment of the present disclosure.
Figure 8:
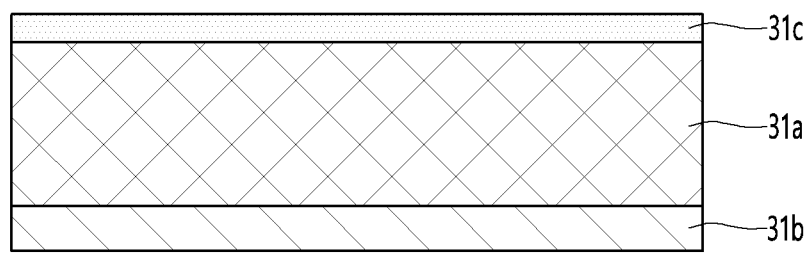
FIG. 8 is a cross-sectional view showing the configuration of the front plate according to another embodiment of the present disclosure.
Figure 9:
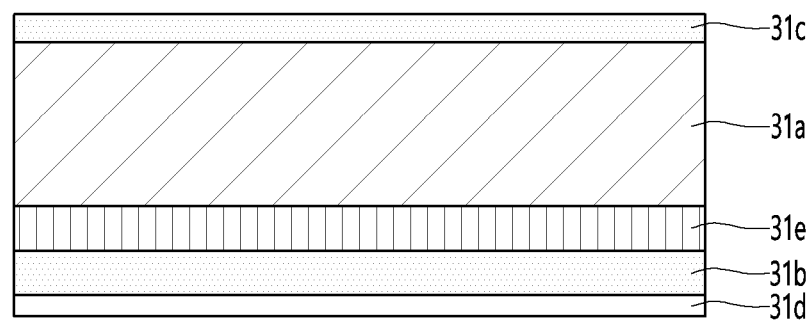
FIG. 9 is a cross-sectional view showing the configuration of the front plate according to another embodiment of the present disclosure.

FIG. 6 is a cross-sectional view taken along line VI-VI' of FIG. 4. FIG. 7 is a cross-sectional view showing the configuration of the front plate according to an embodiment of the present disclosure. FIG. 8 is a cross-sectional view showing the configuration of the front plate according to another embodiment of the present disclosure. Further, FIG. 9 is a cross-sectional view showing the configuration of the front plate according to another embodiment of the present disclosure.

As shown in the drawings, the entire support member 32 may be injection-molded of a resin material, and is formed of a transparent material such that light reflected forward through the light guide plate 33 transmits through the support member 32 and directs the front plate 31.

The support member 32 may include a plate-shaped front portion 321 and side portions 322 protruding rearward from both left and right-side ends of the front portion 321. The front portion 321 may be disposed between the front plate 31 and the light guide plate 33, and a front surface of the front portion 321 may support the front plate 31, and a rear surface of the front portion 321 may support the light guide plate 33.

In addition, the side portions 322 include first surfaces 322a extending rearward from both left and right-side ends of the front portion 321 and a second surface 322b bent at the end of the first surface 322a.

The first surfaces 322a may extend from both left and right-side ends of the front portion 321 to be perpendicular to the front portion 321 and may be formed to form side surfaces of the panel assembly 30. That is, the extended length of the first surface 322a may correspond to the side width of the panel assembly 30. An inner space of the panel assembly 30 may be defined by the first surfaces 322a, and a space in which at least the light guide plate 33, the upper bracket 34, and the lower bracket 35 are mounted may be formed.

A side rib 323 may divide the space formed by the side portions 322 in a front-rear direction to form spaces into which the light guide plate 33, the upper bracket 34, and the lower bracket 35 are slidably inserted.

On the other hand, in the state in which the lighting device 36 is not operated, the front plate 31 may implement the color of the front exterior of the refrigerator 1 by the basic color of the front plate 31 itself.

In a state in which the lighting device 36 is operated, the light reflected from the light guide plate may transmit through the front plate 31 to implement the front exterior of the refrigerator 1 in a color selected by the user.

In addition, the basic color of the front plate 31 may be different from a set color implemented by the lighting device 36.

That is, the front plate 31 may implement the basic color of the front exterior of the refrigerator 1, and when the lighting device 36 is operated, the front plate 31 may be configured such that the front exterior of the refrigerator 1 has a color set by the user.

The front plate 31 forms an overall exterior, and may include a base layer 31a formed of a material capable of transmitting light, and a colored layer 31b provided on one surface of the base layer 31a and implementing the overall color and image of the exterior panel 30.

In addition, a pattern layer 31c forming a texture of the front exterior may be provided on the base layer 31a.

In addition, a protective layer 31d for preventing the base layer 31a from being damaged and from scattering when the base layer 31a is damaged may be further included on the base layer 31a.

Meanwhile, in describing the components constituting the front plate 31, "upward direction" or "downward direction" means directions based on directions shown in FIG. 6. As used herein, "upward direction" may be defined as a direction corresponding to the front surface (front) of the front plate 31. Conversely, "downward direction" may be defined as a direction corresponding to the rear surface (rear) of the front plate 31.

As shown in FIG. 6, the front plate 31 according to an embodiment of the present disclosure has a pattern layer 31c provided above the base layer 31a, and a colored layer 31b and a protective layer 31d provided below the base layer 31a to implement a basic color.

In this case, the base layer 31a may be formed of a glass material. In addition, the pattern layer 31c may be formed with a pattern by the imprinting method described above, and the protective layer 31d may include an anti-shattering film to prevent the base layer 31a from scattering due to damage to the base layer 31a made of a glass material.

In the front plate 31 according to another embodiment of the present disclosure, as shown in FIG. 7, the pattern layer 31c is provided above the base layer 31a, and the colored layer 31b is provided below the base layer 31a to implement a basic color.

The base layer 31a may be formed of a light-transmitting transparent plastic material. As an example of such a plastic material, ABS, PMMA, or PC may be used.

In addition, the pattern layer 31c may provide a texture to the front plate 31 by an imprinting method.

Meanwhile, when the base layer 31a is formed of a plastic material, a separate protective layer 31d may not be required.

In addition, as shown in FIG. 8, the front plate 31 according to another embodiment of the present disclosure may include a base layer 31a made of a glass or plastic material, and a pattern layer 31c provided above the base layer 31a, and the colored layer 31b provided below the base layer 31a.

In addition, a deposition layer 31e may be further included above or below the base layer 31a. The deposition layer 31e may make it possible to more clearly realize the texture of the metal material.

In addition, a protective layer 31d may be further provided below the colored layer 31b.

Hereinafter, each of layers constituting the front plate 31 will be described in detail.

The base layer 31a is formed of glass or a material capable of transmitting light to transmit light emitted by the lighting device 36.

When the base layer 31a is formed of glass, the base layer 31a may be formed of a blue glass, a white glass, or a glass whose surface has been subjected to deposition treatment. In order to prevent damage to the front plate 31, a tempered glass may be included.

Here, the "deposition treatment" may refer to a process in which, when an irregular surface is present on a glass, the irregular surface is treated to be smooth or flat, and a predetermined color is implemented on the surface of the glass.

When the base layer 31a is made of a deposited glass, an irregular surface present in the glass may be polished, so that the exterior panel may be made more luxurious.

The deposition process may be performed by an "evaporation" process in which a metal source is heated, dissolved, and evaporated using high-temperature heat to be deposited on a wafer, that is, the glass. In particular, when depositing, on a glass, $SiO_2$ or $TiO_2$ as a source, various colors of the glass may be realized, making the color of the exterior panel luxurious.

In addition, the deposition process may be performed by a sputtering process in which plasma is formed by a high voltage generated by a voltage generator and the plasma ions collide with a target to attach metal atoms to the wafer, that is, the glass surface to form a metal film.

In addition, when the base layer 31a is formed of a transparent plastic material capable of transmitting light, the base layer 31a may be formed of ABS, PMMA, or PC resin.

On the other hand, unlike the deposition process on the base layer 31a, a deposition layer 31e made of a film deposited with a metal may be further provided on one surface of the base layer 31a.

The deposition layer 31e may be a film deposited with one metal selected from aluminum, chromium, zinc, copper, stainless steel, gold, silver, nickel, cobalt, iron, and tin. Here, the deposition method is not particularly limited.

The deposition layer 31e may optionally be replaced by directly performing a deposition process on the base layer 31a as described above.

By the deposition process, it is possible to provide a metallic texture to the exterior panel 30.

The colored layer 31b for implementing the basic color of the front plate 31 is provided on one surface of the base layer 31a. That is, the colored layer 31b is provided to implement a predetermined color, and may implement the main color of the exterior panel 30 when the lighting device 36 is turned off.

The colored layer 31b may be formed in various colors and may be formed to have light transmittance.

When the lighting device 36 is turned on, the light emitted from the lighting device 36 passes through the base layer 31a, so that the color of the exterior panel 30 is realized by the light sources of the lighting device 36. The lighting device 36 may freely select the color of the light source by the user's operation, so that the overall color of the exterior panel 30 may be changed according to the user's selection.

Further, when the lighting device 36 is turned off, the color implemented by the colored layer 31b is seen through the transparent base layer 31a, thereby realizing the overall color of the exterior panel 30. That is, the colored layer 31b serves to set the basic color of the exterior panel 30 when the lighting device 36 is turned off.

In addition, since the base layer 31a is made of a material capable of transmitting light, other structures such as the lighting device 36 and the support member 32 disposed inside the exterior panel 30 may be seen from the front. The colored layer 31b implements a color or pattern behind the base layer 31a to conceal structures disposed behind the base layer 31a. Accordingly, it is possible to prevent the exterior of other structures such as the lighting device 36 from being exposed to the front of the exterior panel 30.

A method of implementing a color in the colored layer 31b is not limited, but a deposition film or a film subjected to transfer printing is applied, or a silk screen printing method, so-called screen process may be performed to print and implement the color.

In addition, at least one of an organic component, an inorganic component, and an organic-inorganic composite component may be deposited. In addition, the pigment for realizing the color is not limited thereto, but an inorganic or organic pigment may be used.

As another example, the colored layer 31b is preferably implemented by a silk screen printing method that can be used for a material made of glass because the silk screen printing method can express a variety of colors and can be performed regardless of size or material.

On the other hand, the silk screen printing is so-called a screen process in which, when a fabric made of silk or chemical fiber is stretched to make a screen, a non-image portion is covered with paper or glue, and then ink is applied thereon, the ink passes through only the screen of an image portion and printing is performed.

Since the silk screen printing method does not require a separate high-temperature compression process such as the gravure printing method, it is possible to easily form the colored layer 31b on the surface of the base layer 31a made of a glass material or a light-transmitting plastic material.

The pattern layer 31c may be provided above the base layer 31a, that is, in front of the base layer 31a when the exterior panel 30 is viewed from the front.

The pattern layer 31c may provide the exterior panel 30 with a beautiful appearance by providing texture and a sense of luxury to the exterior panel 30.

The pattern layer 31c may include, for example, a plurality of protrusions protruding to an upper side of the base layer 31a by a predetermined height so that the user can feel the unevenness or the stone texture.

Such texture implementation may be implemented through imprinting on a film, etching, silk screen or glass printing method. Preferably, a uniform pattern may be formed irrespective of the length of the exterior panel 30 in the longitudinal direction, and an imprinting method capable of implementing various roughnesses may be used.

Specifically, the pattern layer 31c may be formed by performing an imprinting process on at least one surface of a film to provide various patterns such as a matte pattern or a hairline pattern to the at least one surface of the film. A luxurious texture may be implemented on the entire surface of the exterior panel 30 by the pattern layer 31c.

The film forming the pattern layer 31c may be a transparent film, and may be formed of a resin material. In one example, the film may include at least one resin selected from the group consisting of polyethylene terephthalate (PET), polybutylene terephthalate (PBT), polypropylene (PP), polyethylene (PE), polyvinyl chloride (PVC), polymethylmethacrylate (PMMA), acrynitrilebutadienestyrene (ABS), polycarbonate (PC), and styrene-acrylonitrile copolymer (SAN). Preferably, the use of a transparent PET film having excellent uniformity and transparency may enable texture to be more clearly expressed, but is not limited thereto.

The pattern layer 31c is formed by imprinting of UV curable resin composition applied on the film with a molding roller having a pattern on the film, and UV curing is performed to implement the pattern formed on the molding roller on the film.

In this case, the UV curable resin composition may include, but is not limited to, an acrylate-based oligomer, a monomer, a photoinitiator, and an additive. The acrylate-based oligomer may be, for example, one selected from urethane-based, epoxy-based, ester-based, ether-based, and silicone-based. Preferably, a polyurethane acrylate prepared by reacting diisocyanate, polyol and methacrylate may be used, but is not necessarily limited thereto.

In addition, a release paper coated with an adhesive may be further provided on the pattern layer 31c. The adhesive is preferably a hot-melt type adhesive that is adhered by heat and pressure.

The protective layer 31d may protect the base layer 31a, and when the base layer 31a made of a glass material is damaged, prevent or alleviates scattering of the base layer 31a to reduce the risk of cuts. When the base layer 31a is made of a plastic material, the protective layer 31d may be omitted.

For example, even when the base layer 31a is damaged, scattering of the fragments may be prevented because the fragments are attached to the protective layer 31d. This protective layer 31d may include a scattering prevention film.

In addition, the protective layer 31d may be formed of a film in which a polymer resin is laminated, together with the scattering prevention film. When the protective layer 31d includes a polymer resin in the scattering prevention film, the scattering prevention function and the impact resistance may be improved.

The polymer resin is preferably formed of a material capable of transmitting light, and may include, for example, at least one of polyethylene terephthalate (PET), polyethylene naphthalate (PEN), polyether sulfone (PES), polyimide (PI), polycarbonate (PC) and polymethyl methacrylate (PMMA) but is not limited thereto.

The protective layer 31d may include an adhesive for strengthening adhesion to the base layer 31a or the colored layer 31b. The adhesive is not limited thereto, but may be provided by an acrylic or silicone-based adhesive.

The protective layer 31d is provided at the rear of the base layer 31a, and is formed of a light-transmitting material such that the light emitted from the lighting device 36 can be transmitted to the base layer 31a, and the protective layer preferably has a white or white-based color.

In a case where the base layer 31a is made of a glass material, the protective layer 31d may be disposed behind the base layer 31a when the base layer 31a is viewed from the upper side, that is, the panel assembly 30 is viewed from the front.

Hereinafter, the operation of the refrigerator 1 and the panel assembly 30 having the above structure will be described in more detail with reference to the drawings.

Hereinafter, the front plate 31 will be described as a panel 31.

Figure 10:
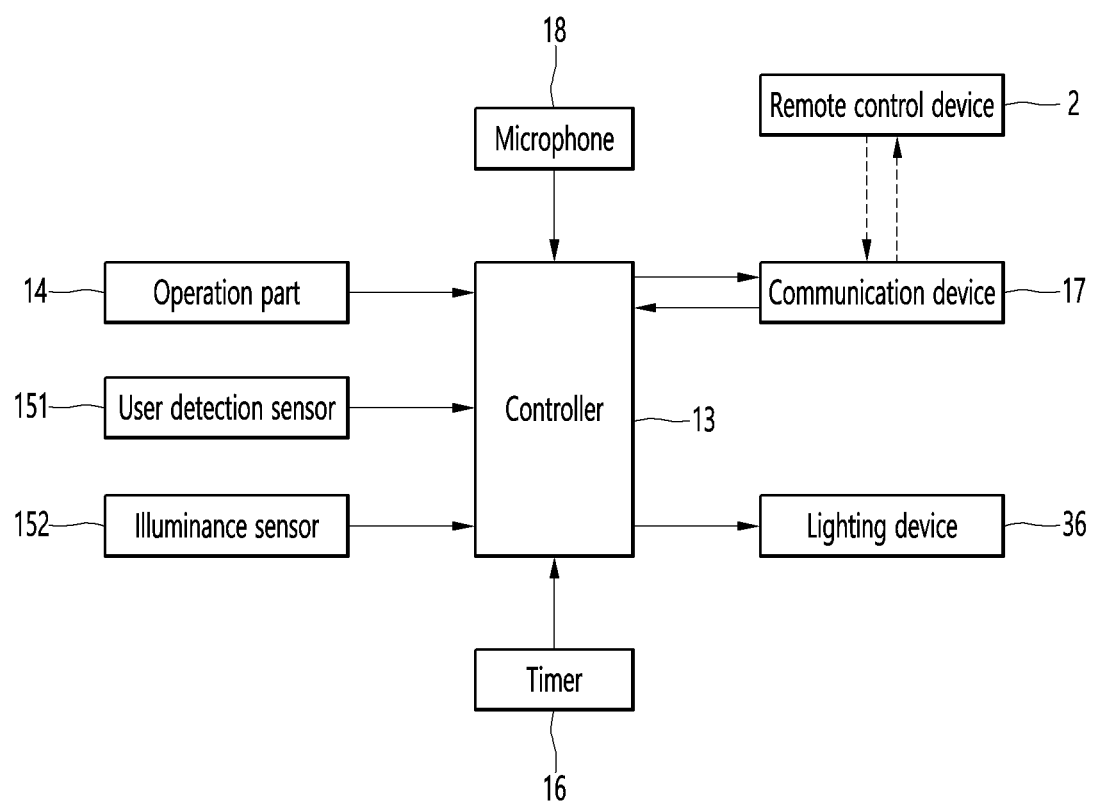
FIG. 10 is a block diagram illustrating a flow of a control signal of the refrigerator.
Figure 11:
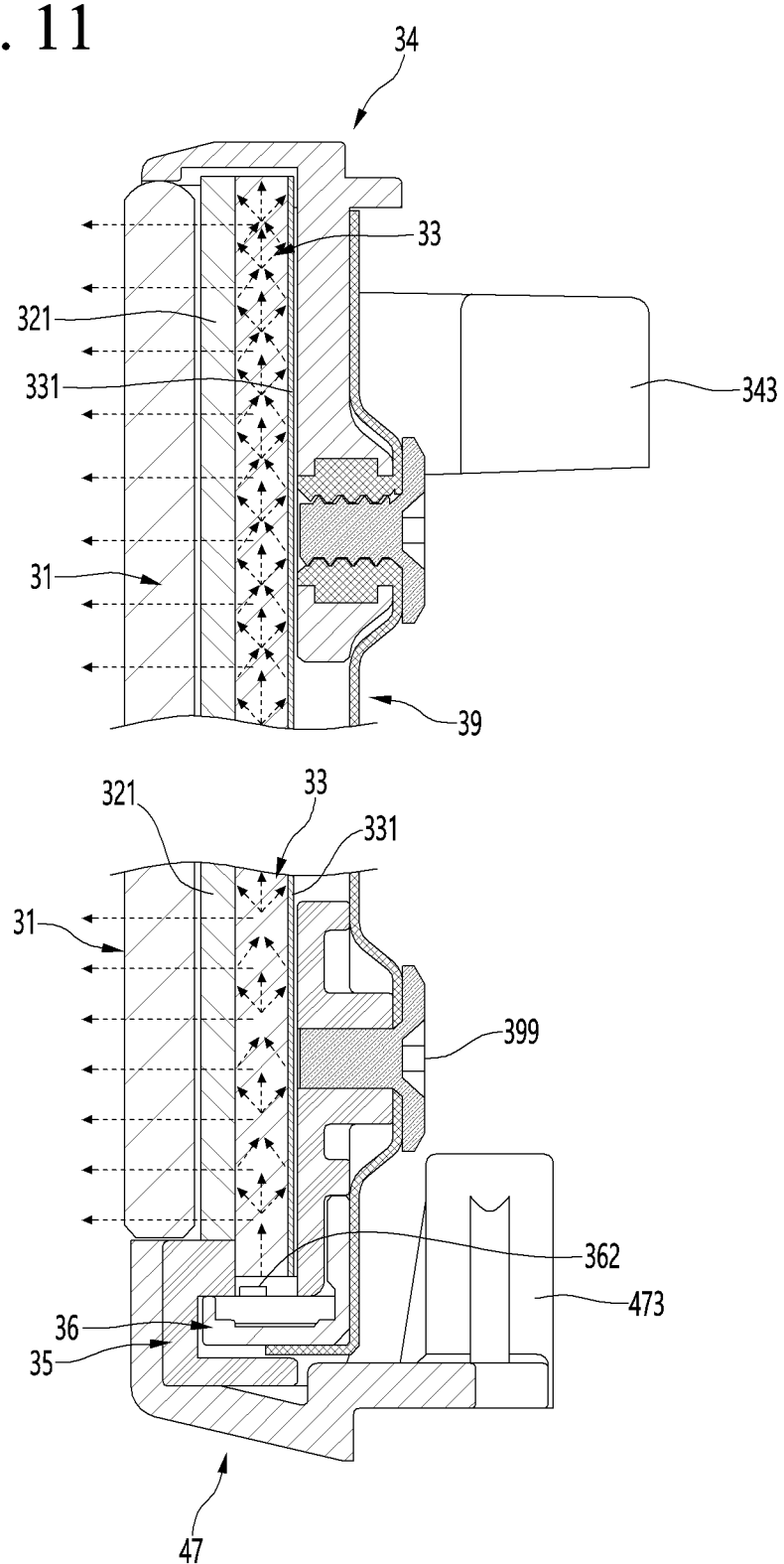
FIG. 11 is a cross-sectional view showing a light emitting state of the panel assembly.
Figure 12:
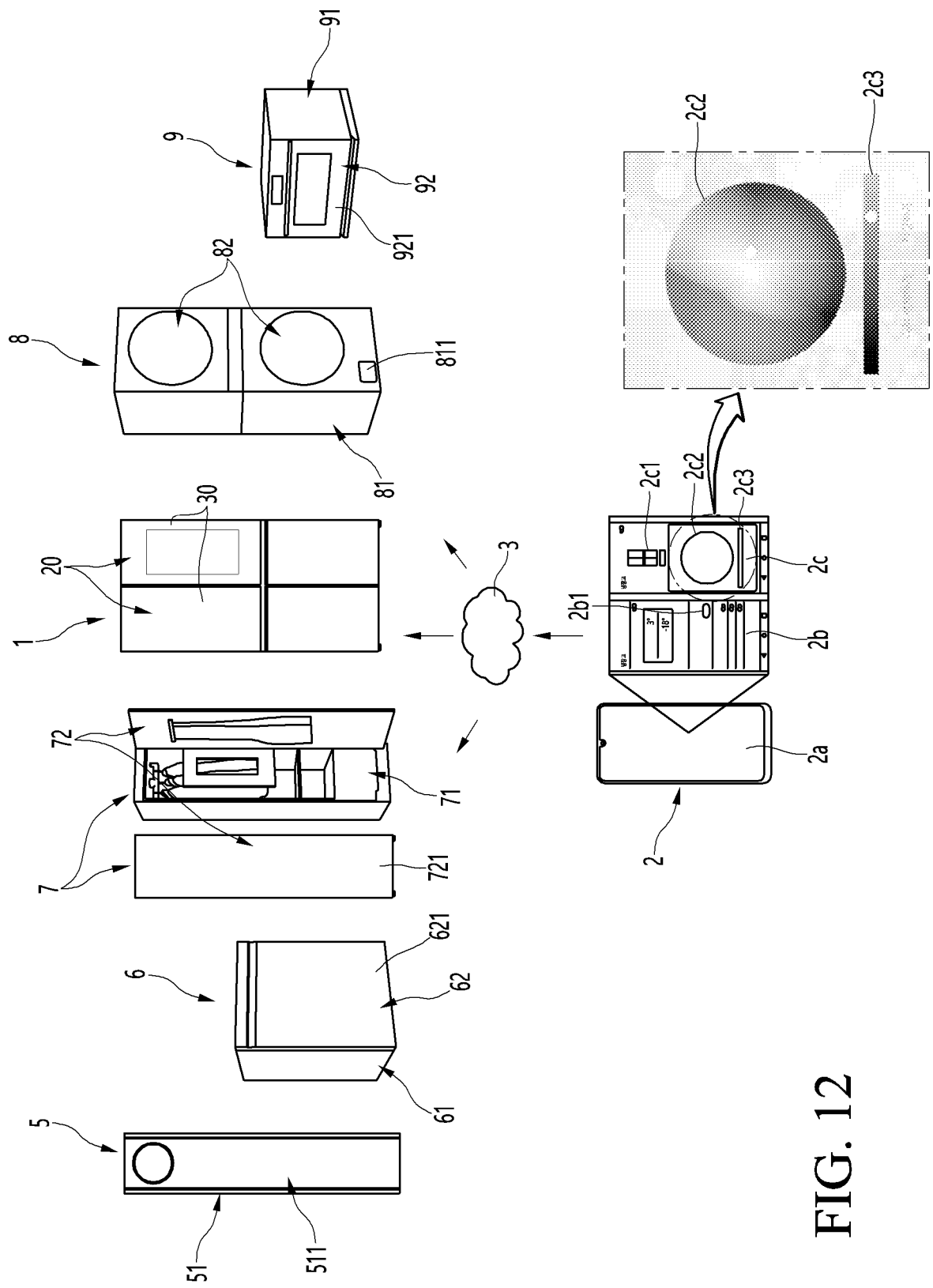
FIG. 12 is a view showing an example of adjusting colors of home appliances to which the panel assembly is applied using a remote device.

FIG. 10 is a block diagram illustrating a flow of a control signal of the refrigerator. The controller 13 may be configured to control the lighting device 36 based on a signal received from an operation part 14 of the refrigerator and/or from a user detection sensor 151 of the refrigerator and/or of an illuminance sensor 152 of the refrigerator and/or from a microphone 18 of the refrigerator and/or from a timer 16 of the refrigerator and/or from a remote device or remote control device 2, e.g. a mobile device, PDA or mobile phone. FIG. 11 is a cross-sectional view showing a light emitting state of the panel assembly. Further, FIG. 12 is a view showing an example of adjusting colors of home appliances to which the panel assembly is applied using the remote device.

As shown in the drawings, the exterior of the home appliance according to an embodiment of the present disclosure may be formed by the panel assembly 30, and the appearance may be changed to have a color set by the user according to the operation of the lighting device 36. The panel assembly may be expressed in various colors by light emitted from the rear side.

The home appliance may be any one of a refrigerator 1, an air conditioner 5, a dishwasher 6, a clothes manager 7, a washing machine 8, or a cooking appliance 9, each of which may employ the same structure as that of the panel assembly 30 of the embodiment of the present disclosure such that the color of the front exterior thereof can be freely changed.

For example, as in the above-described embodiment, in the refrigerator 1, the panel assembly 30 may be provided on the front surface of the door 20 that opens and closes the cabinet 10. In addition, the panel assembly 30 may shine in a set color by a user setting, and the color of the front exterior of the refrigerator 1 may be changed.

As another example, the indoor unit of the air conditioner 5 may have a space, in which a heat exchange device, a fan and the like are provided, inside a case 51 (or a cabinet) that forms an exterior. In addition, the front surface of the case 51 may be formed by a panel assembly 511. The panel assembly 511 may have the same structure as the panel assembly 30 of the refrigerator 1 to emit light.

Accordingly, the panel assembly 511 may shine in a set color by the user setting, and the color of the front exterior of the indoor unit of the air conditioner 5 may be changed to the set color.

As another example, the dishwasher 6 may have a space for washing of dishes inside a case 61 (or a cabinet) that forms an exterior. In addition, the front surface of the case 61 may be opened and closed by the door 62, and the front surface of the door 62 may be formed by the panel assembly 621. The panel assembly 621 may have the same structure as the panel assembly 30 of the refrigerator 1 to emit light.

Accordingly, the panel assembly 511 may shine in a set color by the user setting, and the color of the front exterior of the dishwasher 6 may be changed to the set color.

As another example, the clothes manager 7 may have a space for storing clothes inside a case 71 (or a cabinet) that forms an exterior. In addition, the front surface of the case 71 may be opened and closed by the door 72, and the front surface of the door 72 may be formed by the panel assembly 721. The panel assembly 721 may have the same structure as the panel assembly 30 of the refrigerator 1 to emit light.

Accordingly, the panel assembly 721 may shine in a set color by the user setting, and the color of the front exterior of the clothes manager 7 may be changed to the set color.

As another example, the washing machine 8 or the dryer may have a space for washing or drying inside a case 81 (or cabinet) forming the exterior. In addition, the front of the case 81 may be opened and closed by the door 82. Meanwhile, the front of the case 81 may be formed by a panel assembly 811. The panel assembly 811 may have the same structure as the panel assembly 30 of the refrigerator 1 to emit light.

Accordingly, the panel assembly 30 may shine in a set color by the user setting, and the color of the front exterior of the washing machine 8 or the dryer may be changed to the set color.

As another example, the cooking appliance 9 may have a space for cooking food may be formed inside a case 91 (or a cabinet) that forms an exterior. In addition, the front surface of the case 91 may be opened and closed by the door 92, and the front surface of the door 92 may be formed by the panel assembly 921. The panel assembly 921 may have the same structure as the panel assembly 30 of the refrigerator 1 to emit light.

Accordingly, the panel assembly 921 may shine in a set color by the user setting, and the color of the front exterior of the cooking appliance 9 may be changed to the set color.

Meanwhile, a process of changing the color of the panel assembly 30 will be described below.

In a state in which the lighting device 36 is turned off, a color of the front exterior may be expressed by the color of the panel 31. A color displayed on the panel 31 when the lighting device 36 is turned off may be referred to as a first color.

When the lighting device 36 is turned on, the color of the panel 31 is changed according to the color of the light emitted from the lighting device 36, and the color of the front exterior of the door 20 may be expressed in the selected color. In this case, the color of the light emitted from the lighting device 36 may be referred to as a second color, and the color of the panel that is changed when the lighting device 36 is turned on may be referred to as a third color.

The second color may be different from the third color, and the third color of the panel 31 selected by the user may be implemented by a second color adjusted in consideration of the first color of the panel 31 itself. That is, the light of the second color emitted from the lighting device 36 may be determined by the controller 13 in consideration of the first color of the panel 31 itself, and the panel 31 finally appears in the third color selected by the user while the light with the second color passing through the panel of the first color.

In detail, the color of the panel 31 may be determined by the selective operation of the lighting device 36. For example, the lighting device 36 may be operated and set through a remote device 2 separated from the refrigerator 1. The refrigerator 1 may communicate with the remote device 2 through the communication device 17 connected to the controller 13, and the user operates the lighting device 36 through the remote device 2.

The communication device 17 may communicate with the remote device 2 in various ways. For example, the communication device 17 may have a structure capable of communicating in at least one communication method of wired, wireless and short-range communication (Bluetooth, Wi-Fi, Zigbee, NFC, or the like) methods. In addition, the remote device 2 may be various devices capable of communication, such as a dedicated terminal, a mobile phone, a tablet, a portable PC, a desktop PC, a remote control, and a Bluetooth speaker.

The user may generally operate and set an operating state of the lighting device 36 by operating the remote device 2, such as the operating time, operating conditions, and luminous color of the light source of the lighting device 36. For example, a simple operation and setting of the lighting device 36 may be possible through an application installed on the user's mobile phone or a dedicated program.

The selection of a changed color of the panel 31 through the remote device 2 will be described with reference to FIG. 25. The user may select a desired color of the panel 31 through the screen 2a of the remote device 2 such as a mobile phone or a terminal.

When the user operates the remote device 2, the remote device first outputs a menu screen 2b to enable the user to operate a panel color change menu 2b1 through the menu screen 2b.

When the user selects the panel color change menu 2b1, the remote device 2 may output a color selection screen 2c on the menu screen 2b, and the user may select change a position of the panel 31 to be changed and the color of the panel 31 to be changed on the menu screen 2b.

Specifically, a panel position selection menu 2c1 is displayed on the color selection screen 2c to enable the user to select the panel 31 mounted on the door 20 at a desired position among the plurality of doors 20. In addition, the panel 31 of the door 20 selected by the user may be displayed in the panel position selection menu 2c1.

After selecting a desired position of the panel 31, the user may select and input color selection menus 2c2 and 2c3 displayed on the color selection screen 2c. For example, on the color selection menus 2c2 and 2c3, all colors displayable by the panel 31 may be displayed in the form of a color picker capable of identifying and extracting a color code. The color selection menus 2c2 and 2c3 may be referred to as a palette because combinations and selection of various colors are possible.

The color selection menus 2c2 and 2c3 may include a circular-shaped first selection part 2c2 and a bar-shaped second selection part 2c3. A color may be selected through the first selection part 2c2, and an intensity of the selected color may be selected through the second selection part 2c3. The color selection menus 2c2 and 2c3 may include either one of the first selection part 2c2 and the second selection part 2c3.

As described above, the user can select the color of the panel 31, that is, the third color, from among various colors through the color selection menus 2c2 and 2c3. It is noted that the color selection menus 2c2 and 2c3 may be configured to be inputable in the form of letters, codes, and numbers.

According to the user's selection of the third color, the controller 13 may allow the lighting device 36 to emit light in the second color such that that the panel 31 appears in the third color.

In addition, the user may input a color through an operation part 14 provided in the refrigerator 1 without using the remote device 2.

In addition, the refrigerator 1 and the remote device 2 may be connected to a server via a network, and thus, the color of the panel 31 of the refrigerator 1 may be input through the server 3.

On the other hand, the operation of the lighting device 36 may be controlled through the user's operation of the operation part 14. The operation part 14 may be provided at one side of the refrigerator 1, for example, at one side of the cabinet 10. It is noted that the operation part 14 may be provided on the door 20 as needed, and an input may be performed by operation such as touching or knocking on the panel 31. That is, the user may set the operation of the lighting device 36 by directly operating the operation part 14, and may turn the lighting device 36 on or off.

Also, the lighting device 36 may be operated by a sensor. The sensor may be, for example, a user detection sensor 151 that detects a user's proximity. For example, the user detection sensor 151 may be implemented by various devices capable of detecting the proximity of the user to the vicinity of the refrigerator, such as an infrared sensor, an ultrasonic sensor, or a laser sensor.

In addition, the user detection sensor 151 may be provided on one side of the cabinet or door 20, and may be disposed in various positions for detecting the proximity of the user. Further, a plurality of the sensors may be provided at different positions.

Therefore, when the user approaches the refrigerator 1 by a set distance for use of the refrigerator 1, the user detection sensor 151 detects it and transmits a signal to the controller 13 to allow the lighting device 36 to be turned on. In addition, when the user moves away from the refrigerator 1, the user detection sensor 151 detects it and transmits a signal to the controller 13 to allow the lighting device 36 to be turned off.

Specifically, when it is detected that the user is very close to the refrigerator 1 through the user detection sensor 151, the lighting device 36 may be turned off or the brightness may be gradually dimmed to prevent glare of the user. In addition, when the user moves away from the refrigerator 1 again, the lighting device 36 may be turned on again or may return to the original brightness.

The sensor may be an illuminance sensor 152. The illuminance sensor 152 detects the illuminance of an indoor space and may be disposed at the same location as the user detection sensor 151.

In addition, the lighting device 36 may be operated according to the detected illuminance of the illuminance sensor 152. For example, when the illuminance detected by the illuminance sensor 152 is less than a set illuminance and it is dark, the controller 13 may turn on the lighting device 36, and when the illuminance detected by the illuminance sensor 152 is equal to or greater than the set illuminance and it is bright, the control unit 13 may turn off the lighting device 36.

On the other hand, the sensor may include both the illuminance sensor 152 and the user detection sensor 151, and the controller 13 may allow the lighting device 36 to be turned on and off in cooperation with the illuminance sensor 152 and the user detection sensor 151.

In addition, the controller 13 may be connected to a microphone 18. Therefore, the controller may allow the LED 362 to emit light in a set color according to a voice signal received from the microphone 18, and display the input state of the voice signal or the setting state of the function through the front color of the door 20.

For example, when a temperature control signal of a user is input through the microphone 18, the controller 13 may adjust a temperature in the refrigerator to a set temperature, and operate the lighting device 36 such that the color of the front surface of the door 20 is changed to a color corresponding to the temperature.

On the other hand, the lighting device 36 may be turned on and off at a time set by a timer 16. That is, the lighting device 36 may be turned on according to the time period during which the user is mainly active, and may be maintained in an off state outside the set time period. In addition, the lighting device 36 may be turned off during the day and turned on during the night, regardless of actual illuminance.

In addition, the brightness and color of the front surface of the door 20 may be adjusted according to a user's settings regardless of the operating state of the refrigerator 1.

In addition, the lighting device 36 may include a state in which brightness is adjusted in addition to an on state and an off state. That is, the controller 13 may adjust the output of the light emitted through the lighting device 36 to change the brightness of the panel 31. Also, the operating state of the refrigerator 1 may be indicated through the brightness of the panel 31.

On the other hand, the operating state of the lighting device 36 operated by the controller 13 is described specifically. When the lighting device 36 is turned on according to the instruction of the controller 13, the light emitted by the LED 362 may be emitted toward the lower end of the light guide plate 33. In this case, the light emitted from the LED 362 may be emitted in the second color selected by the controller 13. That is, the LED 362 is an RGB LED and may emit light of the second color adjusted by the controller 13 such that the surface of the panel 31 is able to shine in the third color selected by the user.

Light incident through the lower end of the light guide plate 33 may be diffused and reflected along the light guide plate 33, and may move along the light guide plate 33. In this case, the light guided by the light guide plate 33 may be reflected forward by the reflective layer 331 and be transmitted to the outside by passing through the panel 31.

Light directed forward through the light guide plate 33 passes through the transmitting member 32 to illuminate the panel 31, and the front surface of the door 20 may shine with a set brightness or color.

In this case, the light guide plate 33 may direct light of sufficient brightness from the entire surface forward by the LEDs 362 disposed to both ends of an LED mounting portion 361*a*, and thus the entire surface of the panel 31 including both ends of the panel 31 shines with uniform brightness.

Hereinafter, an operational flowchart of controlling the lighting device in the controller will be described in detail.

Figure 13:
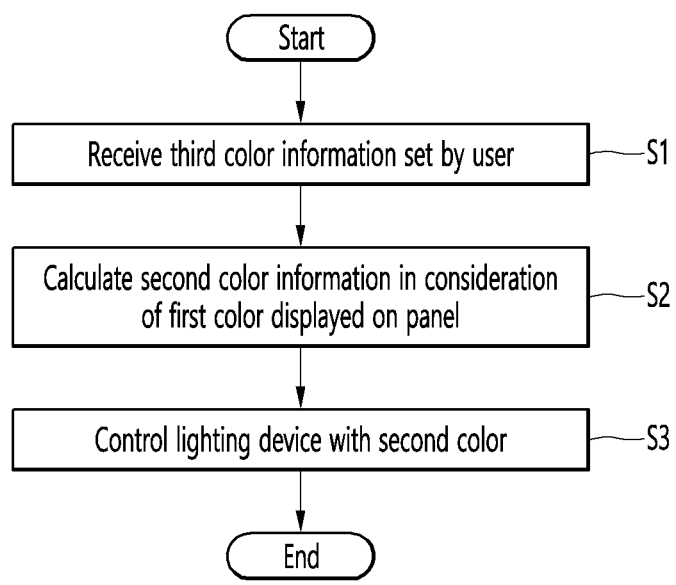
FIG. 13 is a view showing a flowchart for describing operation of controlling a lighting device in a controller.

FIG. 13 is a view showing a flowchart for describing operation of controlling a lighting device in a controller.

Prior to description, a color of the panel 31 itself is defined as a first color. Further, a color of light emitted by light sources of the lighting device is defined as a second color. In addition, a color selected by a user is defined as a third color.

The panel 31 according to an embodiment of the present disclosure may include a colored layer 31*b* that implements the color of the panel 31 itself. The colored layer 31*b* may implement the main color of the front surface of the door when the lighting device 36 is turned off.

In addition, the panel 31 is formed of a material capable of transmitting light, so that when the lighting device 36 is turned on, the light emitted by the light sources passes through the panel 31 to enable the front surface of the door to brightly shine.

On the other hand, the color of the panel 31 itself is formed to have a color with a lightness of 0 or more rather than black. Therefore, in the process in which the color of the light emitted by the light source passes through the panel 31, the color of the light source and the color of the panel 31 itself are mixed, interfered, or absorbed, so that the color of the light emitted by the light source is distorted.

That is, even if the RGB LEDs constituting the light source implement the third color selected by the user and emit light toward the panel 31, a color other than the third color may be seen due to the first color of the panel 31 itself.

Accordingly, in order to implement the third color selected by the user on the panel 31, it is necessary to adjust the degree to which the color of the light emitted from the light source is distorted by the color of the panel 31 itself.

Accordingly, the controller may perform adjustment such that the entire panel is able to appear in the third color selected by the user.

In detail, the controller may receive third color information set by the user (S1). In this case, a user may select a desired color through a remote device or a manipulation device as the third color. The third color may be freely set from a palette in which combinations and selections for various color are possible.

The controller may receive the RGB value of the third color selected by the user.

In addition, the controller may calculate the second color information in consideration of the first color of the panel 31 itself appearing on the panel 31 (S2).

Specifically, the controller may store the RGB values of the first color of the panel 31 in advance. Then, the controller may calculate a second color adjusted in consideration of the RGB value of the third color and the RGB value of the first color.

The second color information may be calculated by, for example, reflecting an adjustment value calculated in consideration of the first color to the RGB value of the third color using a relational expression derived through an experiment.

The controller may control the light sources of the lighting device to emit light with the calculated second color (S3).

When the light sources emit light in the second color, the light may pass through the panel 31 of the first color, so that the front surface of the panel 31 shines in the third color.

Hereinafter, a change in the front exterior of the door 20 according to the operation of the lighting device 36 will be described with reference to the drawings.

Figure 14:
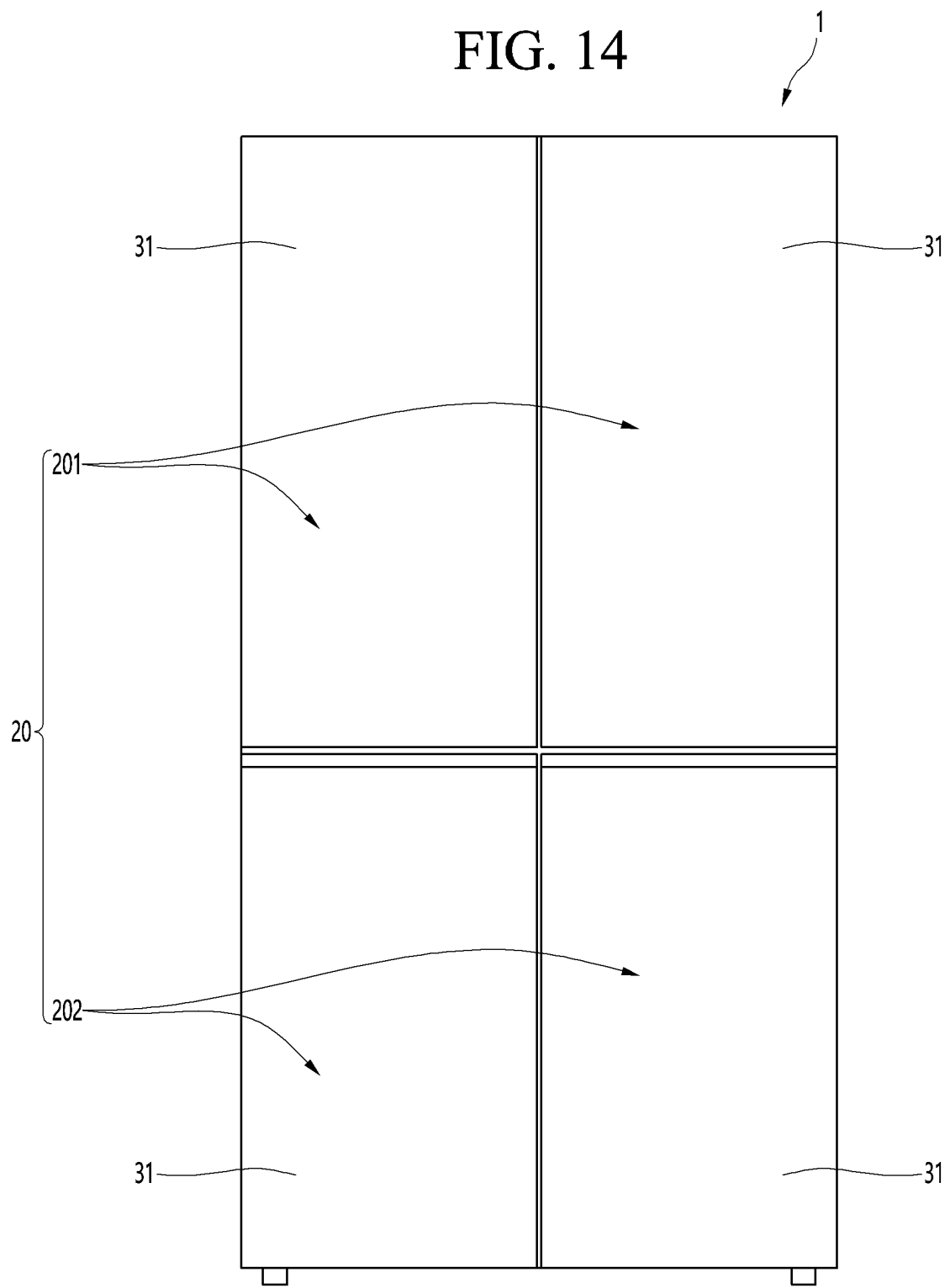
FIG. 14 is a front view showing the front exterior of a refrigerator in a state in which the lighting device is turned off.
Figure 15:
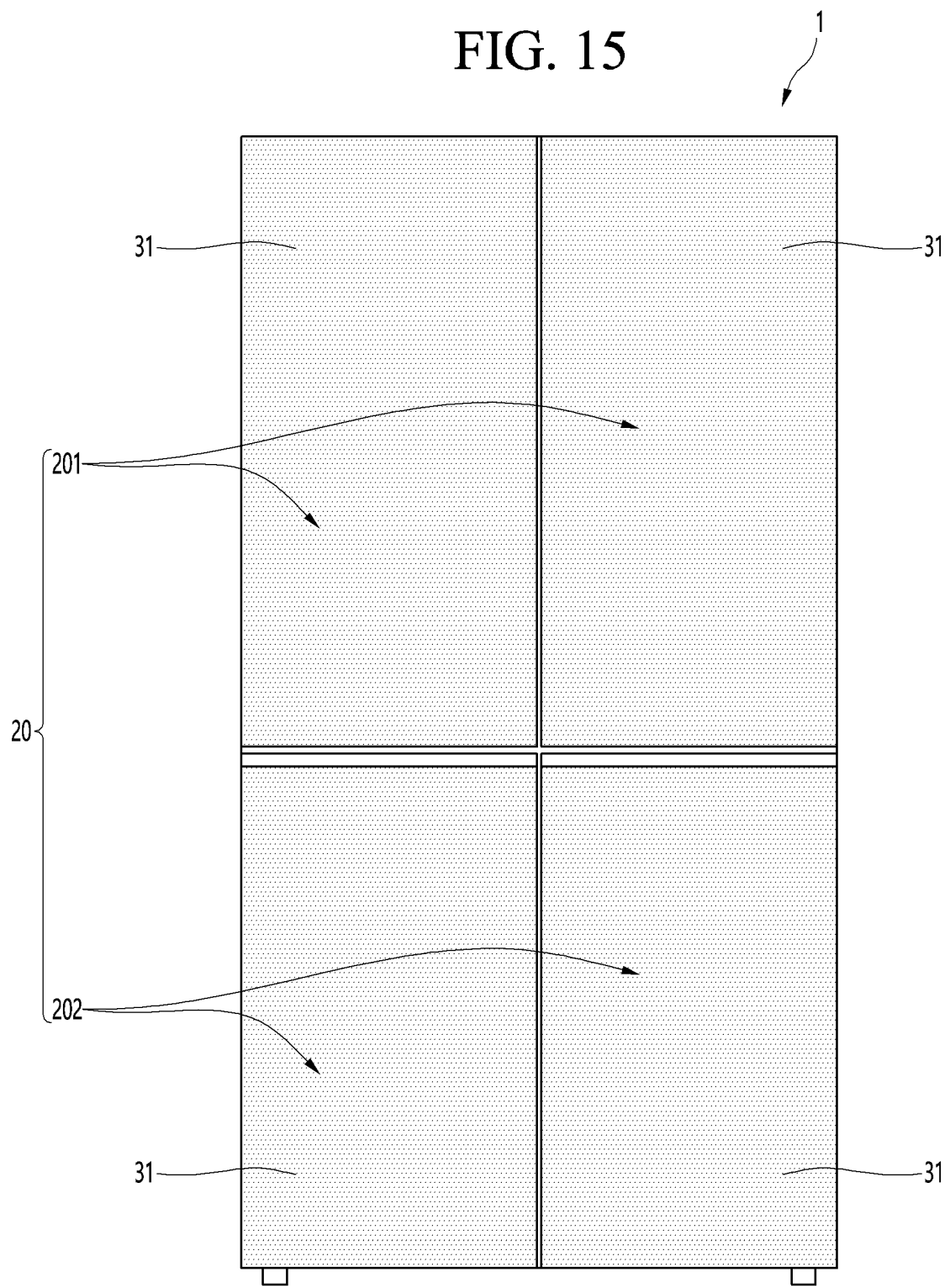
Figure 16:
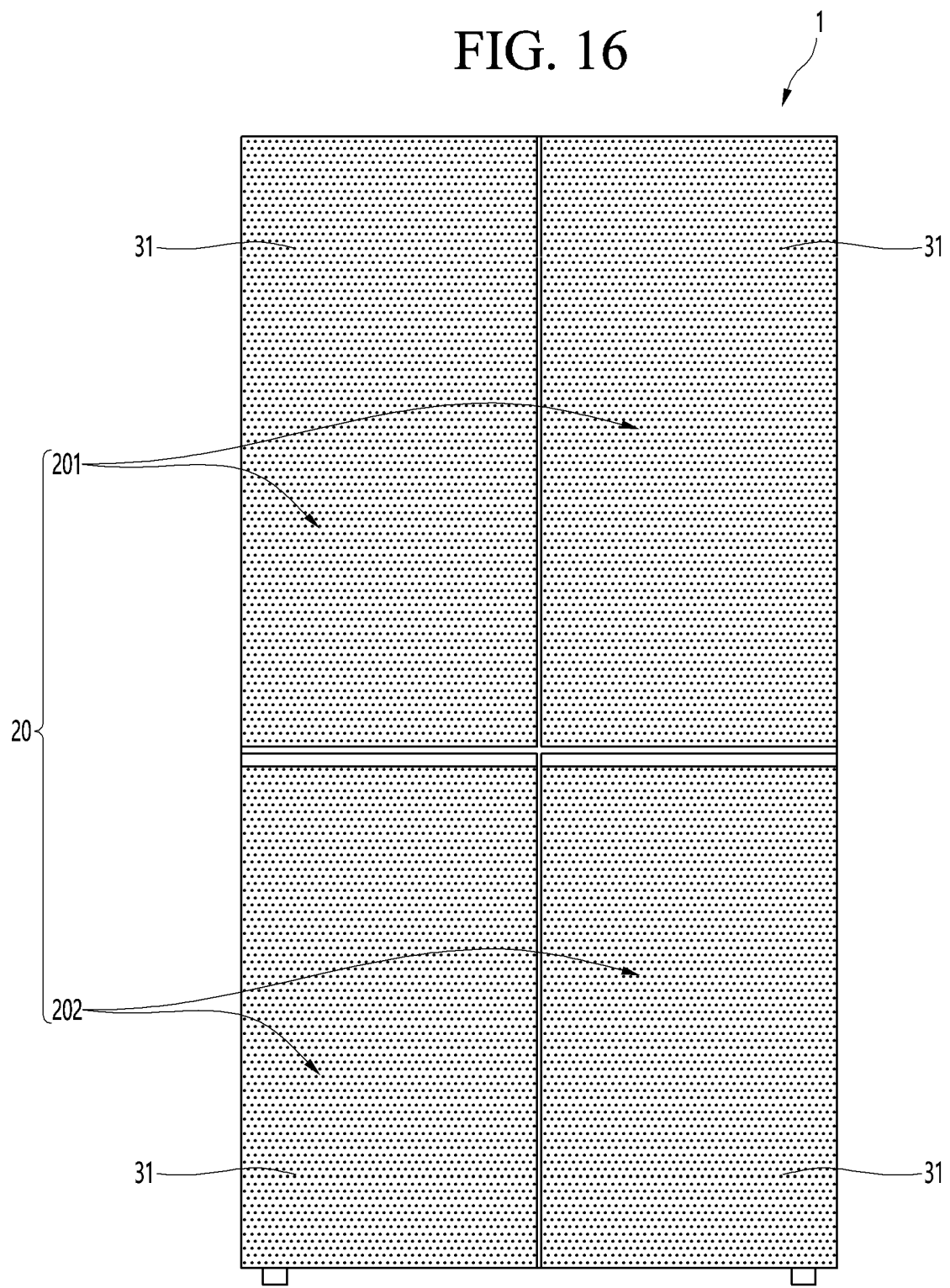
FIG. 16 is a front view showing the front exterior of the refrigerator in a state in which the color of the lighting device is changed.
Figure 17:
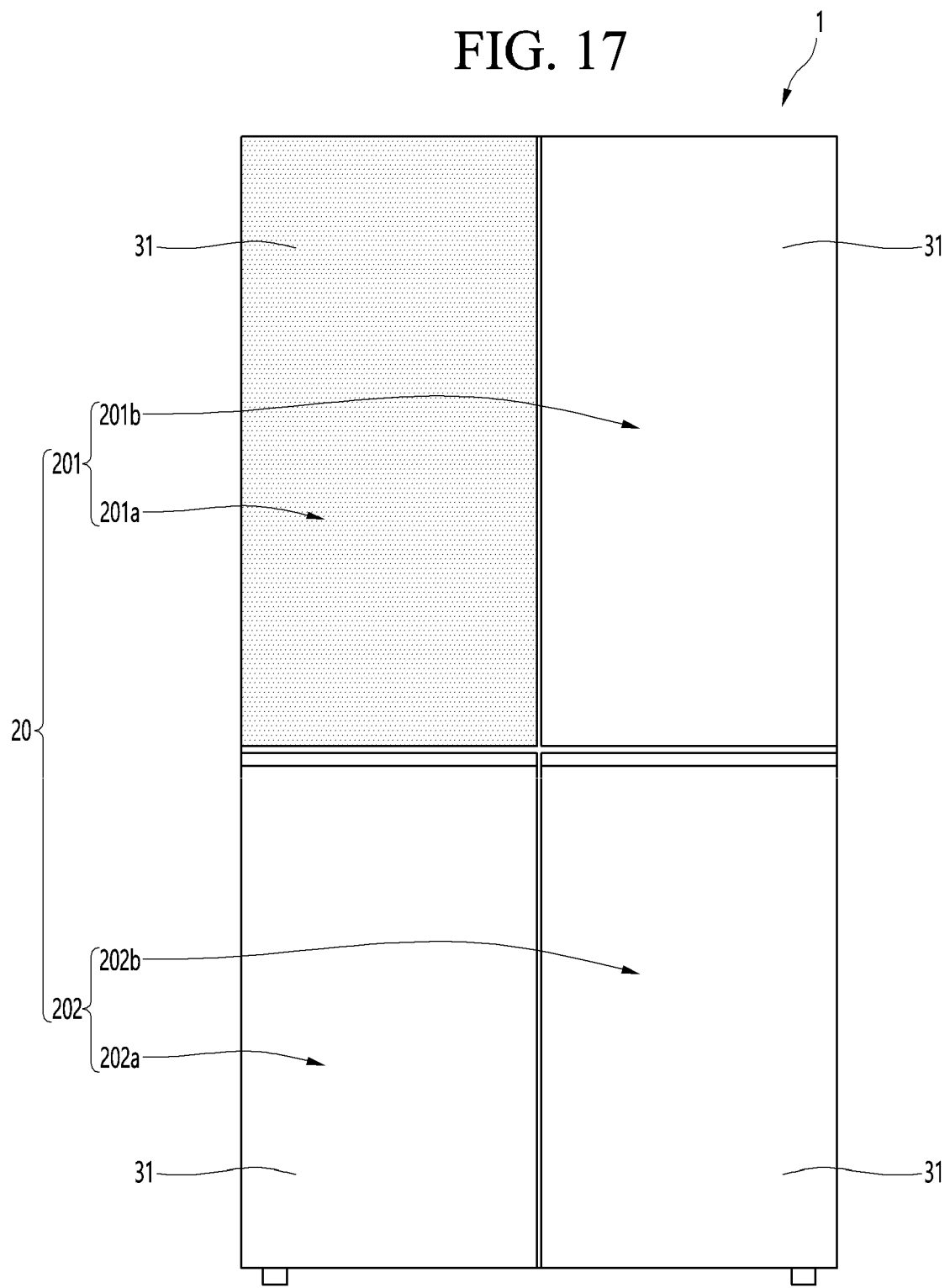
FIG. 17 is a front view showing the front exterior of the refrigerator in a state in which some of the plurality of doors shine.
Figure 18:
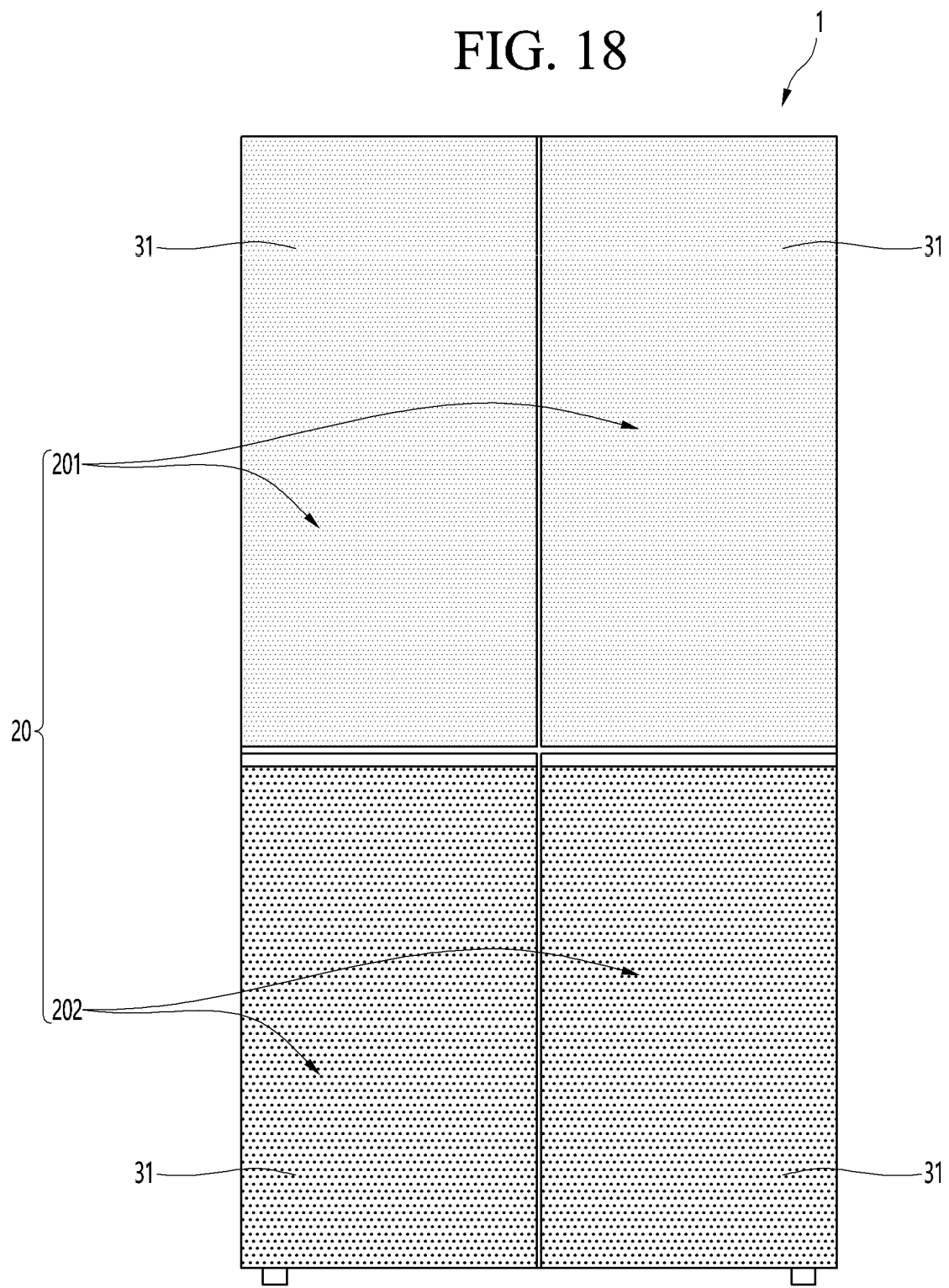
FIG. 18 is a front view showing the front exterior of the refrigerator in a state in which the refrigerating chamber door and the freezing chamber door are luminous.

FIG. 14 is a front view showing the front exterior of a refrigerator in a state in which the lighting device is turned off. FIG. 15 is a front view showing the front exterior of the refrigerator in a state in which the lighting device is turned on. FIG. 16 is a front view showing the front exterior of the refrigerator in a state in which the color of the lighting device is changed. FIG. 17 is a front view showing the front exterior of the refrigerator in a state in which some of the plurality of doors emit light. FIG. 18 is a front view showing the front exterior of the refrigerator in a state in which the refrigerating chamber door and the freezing chamber door are luminous.

The home appliance according to an embodiment of the present disclosure includes a cabinet having a predetermined space, a door that opens and closes the space, a screen that is detachably installed on the front surface of the door to change from a first color recognized by a user at the front of the door to a second color selected by the user and display the second color; a remote communication terminal that enables the user to identify the second color after selecting the second color, and RGB LEDs that display a color mixed between light emitting elements on the screen according to the selection of the second color by the remote communication terminal, wherein the first color may be a color in a state in which the RGB LEDs are turned off, and the first color may be changeable.

Here, the screen may correspond to the aforementioned panel 31.

In addition, a home appliance according to an embodiment of the present disclosure may include a cabinet having a predetermined space; a door that opens and closes the space; a screen installed on the front surface of the door to change from a first color recognized by the user to a third color selected by the user at the front of the door and perform display; an operation part that enables the user to select third color; and RGB LEDs that emit light with a second color toward the screen, the second color being generated by mixing light of the light emitting elements. In addition, the controller may perform control such that the third color is displayed on the screen, the third color being generated by mixing the first color when the RGB LEDs are turned off and the second color when the RGB LEDs are turned on.

In addition, a home appliance according to an embodiment of the present disclosure includes a cabinet having a first space and a second space; a first door for opening and closing the first space; a second door for opening and closing a second space; a first screen installed on the front surface of the first door to perform change to a third color selected by the user and display the third color; a second screen installed on the front surface of the second door to perform change to a fourth color selected by the user and display the fourth color; a remote communication terminal for enabling the user to select the first door and then set the third color or select the second door and then set the fourth color; a first RGB LED for emitting light of a color generated by mixing light from light emitting elements toward the first screen according to selection of the third color through the remote communication terminal; and a second RGB LED for emitting light of a color generated by mixing light from light emitting elements toward the second screen according to selection of the fourth color through the remote communication terminal.

Specifically, in a state in which the lighting device 36 is turned off, as shown in FIG. 14, the front surface of the door 20 does not shine, and the original color of the panel assembly 30, that is, the first color is visible.

The panel assembly 30 has a structure that is separable from the door body 40, so that a user can select an initial color of the panel 31 by mounting the panel assembly 30 of a desired color. It is noted that, if necessary, the user may change the color of the panel 31 when the lighting device 36 is turned off, by exchanging the panel assembly 30 itself.

The color of the front surface of the door 20 may be seen as the color of the panel 31, and the texture and pattern formed on the panel 31 may be seen. In this case, the panel 31 may be formed to have a color having a lightness greater than 0, other than black.

Accordingly, the surface of the front surface of the door 20 is seen in the first color that is the color of the panel 31, and in this case, the components inside the panel assembly 30 cannot be seen from the outside by the color of the panel 31 without seeing through the panel 31.

In this state, the lighting device 36 may be turned on, and when the lighting device 36 is turned on, the front surface of the door 20 shines in a color selected by the user.

For example, as shown in FIG. 15, the controller 13 may perform control such that the front surface of the door 20 shines in a third color different from the first color, and the lighting device 36 may allow the LED 362*s* to emit light of the second color under the control of the controller 13. In this case, the third color may be selected by the user, and the color of the panel 31 may be selected by the operation of the remote device 2 or the operation of the operation part 14.

When the LED 362 emits light in the second color, the light reflected by the light guide plate 33 passes through the front surface of the panel 31, and the front surface of the door 20, that is, the panel 31 may be seen in the third color.

On the other hand, when the controller 13 instructs the lighting device 36 to change the color of the light emitted from the lighting device 36 while the front exterior of the refrigerator 1 shines in the third color, the panel 31 may shine in a different color reset by the controller 13.

For example, as shown in FIG. 16, the controller 13 may instruct the panel 31 to shine in a fourth color different from the third color, and the lighting device 36 may allow the LED 362 to emit light of a different color under the control of the controller 13.

When the LED 362 emits light in the different color, the light reflected by the light guide plate 33 passes through the panel 31, and the front surface of the door 20, that is, the panel 31 may be seen in the fourth color.

On the other hand, the panel 31 constituting some doors 20 of the plurality of doors 20 forming the front exterior of the refrigerator 1 emits light or the panels 31 constituting the plurality of doors 20 may independent emit light to form the front exterior of the refrigerator 1 in set colors.

For example, as shown in FIG. 17, the refrigerator 1 may be operated such that the panel 31 of some doors 20 among the plurality of doors 20 shines or shines in a specific color. That is, not all of the lighting devices 36 provided in the doors 20 are operated, but may be configured such that only some doors 201*a* of all doors 20 shine. For example, any one door 201*a* of the refrigerating chamber doors 201 may shine. That is, the left refrigerating chamber door 201*a* among the left refrigerating chamber door 201*a* and the right refrigerating chamber door 201*b* may shine. It is noted that, as for the doors 20, any one of the freezing chamber doors 202 may shine.

If necessary, the left refrigerating chamber door 201*a* and the right refrigerating chamber door 201*b* may shine in different colors. In addition, colors of at least two or more of the doors 20 may be sequentially changed, and at least two or more of the doors 20 may be sequentially turned on and off.

Meanwhile, the refrigerating chamber door 20 or the freezing chamber door 20 among the doors may be controlled to shine in different colors.

For example, as shown in FIG. 18, the controller 13 may control the lighting device 36 such that the panels of the pair of refrigerating chamber doors 201 are seen in one color. In addition, the controller 13 may control the lighting device 36 such that the pair of refrigerating chamber doors 201 are seen in different colors.

That is, the refrigerating chamber door 201 and the freezing chamber door 202 may be distinguished by colors, and the colors of the refrigerating chamber door 201 and the freezing chamber door 202 may be changed according to a change in temperature of the refrigerator.

Accordingly, the user can intuitively grasp the operating state of each storage space as well as distinguish between the refrigerating chamber and the freezing chamber through colors of the front surface of the door 20.

On the other hand, the present disclosure may be implemented in various other embodiments in addition to the above-described embodiment. According to another embodiment of the present disclosure, a storage space may be partitioned on left and right sides, and the doors may include a refrigerating chamber door and a freezing chamber door on the left and right sides. The another embodiment of the present disclosure has the same structure as the above-described embodiment except for the arrangement of the storage spaces and the doors, and the same reference numerals are used for the same components, and detailed descriptions thereof will be omitted.

The invention claimed is:

1. An appliance comprising:
a cabinet that defines a storage space;
a door configured to open and close at least a portion of the storage space, the door comprising a panel assembly that comprises (i) a lighting device configured to emit light and (ii) a front plate that defines an exterior of the door and is configured to transmit the light; and
a controller configured to control the lighting device to selectively make the front plate be seen by a user as a first color and a second color, the second color being selected by the user and different from the first color,
wherein the lighting device is disposed at the door and configured to emit light having a third color that is different from the first color and the second color,
wherein the front plate comprises a base layer and a colored layer disposed at the base layer, the colored layer having the first color and being configured to transmit the light of the lighting device, and
wherein the controller is configured to:
turn on the lighting device to thereby make the front plate be seen by the user as the second color based on the light of the lighting device being transmitted through the colored layer, the second color corresponding to a color mix of the first color of the colored layer and the third color of the light emitted from the light device, and
turn off the lighting device to thereby make the front plate be seen by the user as the first color.

2. The appliance of claim 1, wherein the colored layer is disposed on a rear surface of the base layer.

3. The appliance of claim 2, wherein the front plate further comprises a pattern layer that is disposed at a front surface of the base layer and defines a texture of the door.

4. The appliance of claim 3, wherein the pattern layer comprises a transparent film made of a resin material.

5. The appliance of claim 3, wherein the pattern layer comprises an imprint pattern made of an ultraviolet (UV) cured resin composition.

6. The appliance of claim 1, wherein the lighting device comprises a plurality of light-emitting diodes (LEDs).

7. The appliance of claim 6, wherein the LEDs include red, green, and blue (RGB) LEDs.

8. The appliance of claim 1, wherein the front plate further comprises a protective layer disposed at a surface of the colored layer opposite to the base layer.

9. The appliance of claim 8, wherein the protective layer comprises an anti-scattering film.

10. The appliance of claim 1, further comprising a deposition layer disposed between the base layer and the colored layer.

11. The appliance of claim 10, wherein the deposition layer is made of metal.

12. The appliance of claim 1, wherein the colored layer is disposed on a rear surface of the base layer, and
wherein the front plate further comprises:
a pattern layer that is disposed at a front surface of the base layer and defines a texture of the exterior of the door; and
a protective layer that is disposed at a rear surface of the colored layer opposite to the base layer.

13. The appliance of claim 12, wherein the front plate further comprises a deposition layer made of metal and disposed between the base layer and the colored layer.

14. The appliance of claim 1, wherein the controller is configured to:
adjust the third color based on the first color to thereby enable the front plate to be seen by the user as the second color.

15. The appliance of claim 1, wherein the controller is configured to receive a user input for selecting the second color from a plurality of different colors.

16. The appliance of claim 1, wherein the base layer is made of a transparent material.

17. The appliance of claim 1, wherein the base layer is made of at least one of glass, a transparent plastic material, acrylonitrile butadiene styrene (ABS), polymethyl methacrylate (PMMA), or polycarbonate (PC) resin.

18. The appliance of claim 1, wherein a lightness of the first color is greater than a lightness of a black color.

19. The appliance of claim 1, wherein the colored layer is disposed on the base layer by silk screen printing.

20. The appliance of claim 1, wherein the door further comprises a door body that is coupled to a rear side of the panel assembly.

* * * * *